United States Patent
Chuang et al.

(10) Patent No.: US 11,815,784 B2
(45) Date of Patent: Nov. 14, 2023

(54) UNITED STATES FREQUENCY CONVERSION USING INTERDIGITATED NONLINEAR CRYSTAL GRATINGS

(71) Applicant: KLA Corporation, Milpitas, CA (US)

(72) Inventors: Yung-Ho Alex Chuang, Cupertino, CA (US); Yinying Xiao-Li, San Jose, CA (US); Elena Loginova, Milpitas, CA (US); John Fielden, Los Altos, CA (US); Baigang Zhang, San Jose, CA (US); Xuefeng Liu, San Jose, CA (US); Kelly Ann Weekley Mauser, Santa Clara, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 18/087,236

(22) Filed: Dec. 22, 2022

(65) Prior Publication Data

US 2023/0161221 A1 May 25, 2023

Related U.S. Application Data

(63) Continuation of application No. 17/555,404, filed on Dec. 18, 2021, now Pat. No. 11,567,391.
(Continued)

(51) Int. Cl.
*G02F 1/35* (2006.01)
*G02F 1/355* (2006.01)

(52) U.S. Cl.
CPC ............ *G02F 1/354* (2021.01); *G02F 1/3503* (2021.01); *G02F 1/3507* (2021.01); *G02F 1/3548* (2021.01); *G02F 1/3551* (2013.01)

(58) Field of Classification Search
None
See application file for complete search history.

(56) References Cited

U.S. PATENT DOCUMENTS 6,201,601 B1 3/2001 Vaez-Iravani et al.
6,271,916 B1 8/2001 Marxer et al.
(Continued)

FOREIGN PATENT DOCUMENTS

CN 110068979 A 7/2019
EP 1255331 A1 11/2002
(Continued)

OTHER PUBLICATIONS

Aleksandrovsky, A.S., article entitled "Nonlinear optical processes and DUV generation in random domain structures of SBO", 2015 Conference on Lasers and Electro-Optics (CLEO), 2015, pp. 1-2 (Year: 2015).
(Continued)

*Primary Examiner* — Rhonda S Peace
(74) *Attorney, Agent, or Firm* — Bever, Hoffman & Harms, LLP

(57) ABSTRACT

A nonlinear crystal grating assembly including two integral nonlinear crystal grating structures having inverted crystal axes and having parallel spaced-apart mesas with predetermined mesa widths arranged such that, when assembled in an interdigitated configuration, the mesas of the two grating structures form an alternating grating pattern that is aligned with a propagation direction of input light, thereby creating a periodic structure for quasi-phase-matching (QPM). The nonlinear crystal grating structures are formed using strontium tetraborate, lithium triborate or another nonlinear crystal material. The nonlinear crystal grating assembly is utilized in a laser assembly in which fundamental wavelengths are doubled and/or summed using intermediate frequency conversion stages, and then a final frequency converting stage utilizes the nonlinear crystal grating assembly to double or sum one or more intermediate light beam frequencies to generate laser output light at high power and photon energy levels. A method and inspection system are also described.

15 Claims, 14 Drawing Sheets

Related U.S. Application Data

(60) Provisional application No. 63/282,706, filed on Nov. 24, 2021.

(56) References Cited

U.S. PATENT DOCUMENTS

| | | | |
|---|---|---|---|
| 7,525,649 | B1 | 4/2009 | Leong et al. |
| 7,817,260 | B2 | 10/2010 | Chuang et al. |
| 8,298,335 | B2 | 10/2012 | Armstrong |
| 8,824,514 | B2 | 9/2014 | Armstrong |
| 8,976,343 | B2 | 3/2015 | Genis |
| 9,023,152 | B2 | 5/2015 | Dribinski |
| 9,059,560 | B2 | 6/2015 | Dribinski et al. |
| 9,250,178 | B2 | 2/2016 | Chuang et al. |
| 9,293,882 | B2 | 3/2016 | Chuang |
| 9,318,869 | B2 | 4/2016 | Chuang et al. |
| 9,459,215 | B2 | 10/2016 | Chuang et al. |
| 9,461,435 | B2 | 10/2016 | Dribinski et al. |
| 9,509,112 | B2 | 11/2016 | Chuang et al. |
| 9,660,409 | B2 | 5/2017 | Chuang |
| 9,891,177 | B2 | 2/2018 | Vazhaeparambil et al. |
| 10,044,166 | B2 | 8/2018 | Chuang et al. |
| 10,175,555 | B2 | 1/2019 | Chuang et al. |
| 10,282,366 | B2 | 5/2019 | Cai et al. |
| 10,283,366 | B2 | 5/2019 | Chuang et al. |
| 10,809,594 | B2 | 10/2020 | Yu et al. |
| 10,921,261 | B2 | 2/2021 | Chuang et al. |
| 11,180,866 | B2 | 11/2021 | Chuang et al. |
| 11,237,455 | B2 | 2/2022 | Chuang et al. |
| 11,543,732 | B2 | 1/2023 | Chuang et al. |
| 11,567,391 | B1 * | 1/2023 | Chuang .................. G02F 1/354 |
| 2005/0163187 | A1 | 7/2005 | Spinelli et al. |
| 2012/0113995 | A1 | 5/2012 | Armstrong |
| 2013/0077086 | A1 | 3/2013 | Chuang et al. |
| 2015/0168645 | A1 | 6/2015 | Shen et al. |
| 2016/0240996 | A1 | 8/2016 | Vogler et al. |
| 2018/0034227 | A1 | 2/2018 | Trull-Silvestre et al. |
| 2021/0010948 | A1 | 1/2021 | Chuang et al. |
| 2021/0389643 | A1 * | 12/2021 | Chuang .................. G02F 1/3542 |
| 2022/0066283 | A1 | 3/2022 | Gapontsev et al. |
| 2022/0066284 | A1 | 3/2022 | Perlov et al. |
| 2023/0161221 | A1 * | 5/2023 | Chuang ................. G02F 1/3503 359/328 |

FOREIGN PATENT DOCUMENTS

| | | |
|---|---|---|
| JP | 2006073970 A | 3/2006 |
| WO | 2020131652 A1 | 6/2020 |
| WO | 2020132043 | 6/2020 |

OTHER PUBLICATIONS

Aleksandrovsky, A.S., et al., article entitled "Nonlinear Diffraction And Random QPM in Strontium Tetraborate", CAOL 2008, Sep. 29-Oct. 4, Ukraine, 978-1-4244-1974-6, 2008 IEEE, 3 pages.

Aleksandrovsky, A.S., et al. articled entitled "Conversion of radiation in nonlinear photonic crystals of strontium tetraborate", CLEO/Europe—EQEC 2009—European Conference on Lasers and Electro-Optics and the European Quantum Electronics Conference, 2009, pp. 1 (Year: 2009).

Faris, Gregory W. et al., article entitled "Two-photon excitation of neon at 133 nm", Optics Letters, vol. 18, No. 5, Mar. 1, 2003, 3 pages.

Kashyap, R., et al., article entitled "Efficient broadband frequency conversion using engineered apodized x(2) gratings and fundamental harmonic resonance", 2009 14th OptoElectronics and Communications Conference, 2009, pp. 1-2, doi: 10.1109/OECC.2009. 5213443 (Year: 2009).

KLA Corporation—U.S. Appl. No. 17/239,561 entitled "Frequency Conversion Using Stacked Strontium Tetraborate Plates", filed Apr. 23, 2021, now U.S. Pat. No. 11,237,455 listed under U.S. Patents above.

KLA Corporation—U.S. Appl. No. 63/038,134 entitled "177nm and 133nm CW Lasers Using Stacked Strontium Tetraborate Plates", filed Jun. 12, 2020.

KLA Corporation—U.S. Appl. No. 63/076,391 entitled "152nm and 177nm CW Lasers Using Stacked Strontium Tetraborate Plates", filed Sep. 10, 2020.

Kurimura, Sunao et al., article entitled "Quartz revisits nonlinear optics: twinned crystal for quasi-phase matching [Invited]", Optical Materials Express 1375, Nov. 1, 2011, vol. 1, No. 7, 9 pages.

Oseledchik, Yu S., et al., article entitled "New nonlinear optical crystals: strontium and lead tetraborates", Optical Materials 4, Jun. 15, 1995, pp. 669-674.

Petrov, Valentin et al., article entitled "Application of the nonlinear crystal $SrB_4O_7$ for ultrafasr diagnostics converting to wavelengths as short as 125 nm", Optics Letters, Feb. 15, 2004, vol. 29, No. 4, 3 pages.

Szilagyi, A., et al., article entitled "A quasi-phase-matching technique for efficient optical mixing and frequency doubling", Journal of Applied Physics 47.2025 (1976), published online: Aug. 28, 2008, 9 pages.

Thompson, D.E., et al., article entitled "Second-harmonic generation to GaAs "stack of plates" using high-power Co2 laser radiation", Applied Physics Letters 29, 113 (1976) published on line Aug. 28, 2008, 4 pages.

Trabs, Peter et al., article entitled "Generation of Coherent Vacuum UV Radiation in Randomly Quasi-Phase-Matched Strontium Tetraborate", Optics Letters, May 2015, 3 pages.

Trabs, Peter et al., article entitled "Spectral fringes in non-phase-matched SHG and refinement of dispersion relations in the VUV", Optical Society of America, published Apr. 10, 2015, vol. 23, No. 8, Optics Express 10091, 6 pages.

Tunnermann, Andreas et al., "Generation of Tunable Short Pulse VUV Radiation by Four-Wave Mixing in Xenon with Femtosecond KrF-Excimer Laser Pulses", IEEE Journal of Quantum Electronics, Vo. 29, No. 4, Apr. 1993, 6 pages.

Villora, Encamacion G., et al., article entitled "Birefringent- and quasi phase-matching with $BaMgF_4$ for vacuum-UV/UV and mid-IR all solid-state lasers", Optical Society of America, published Jul. 6, 2009, vol. 17, No. 15, 17 pages.

\* cited by examiner

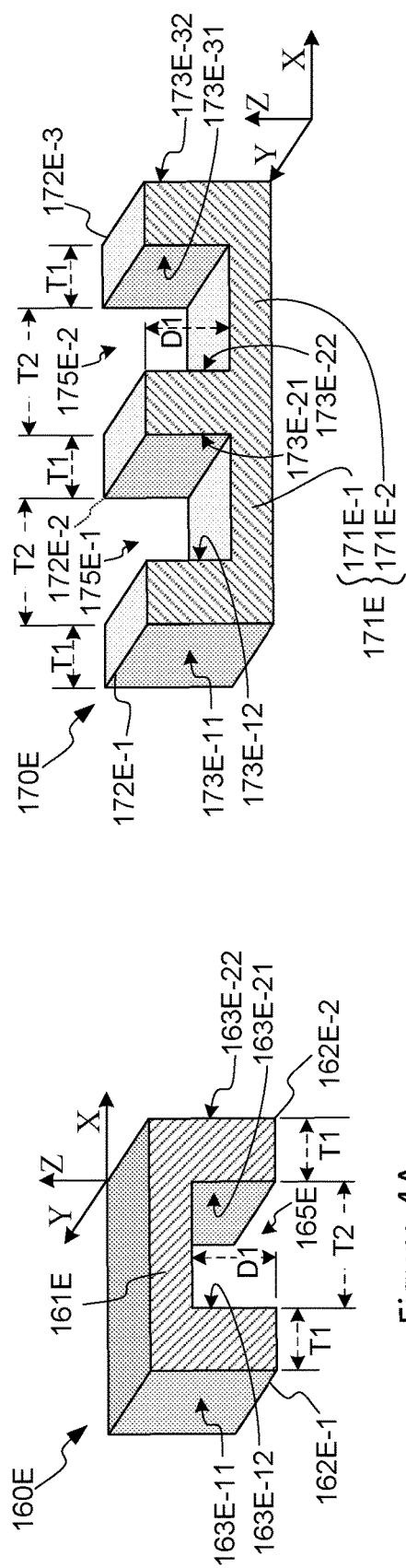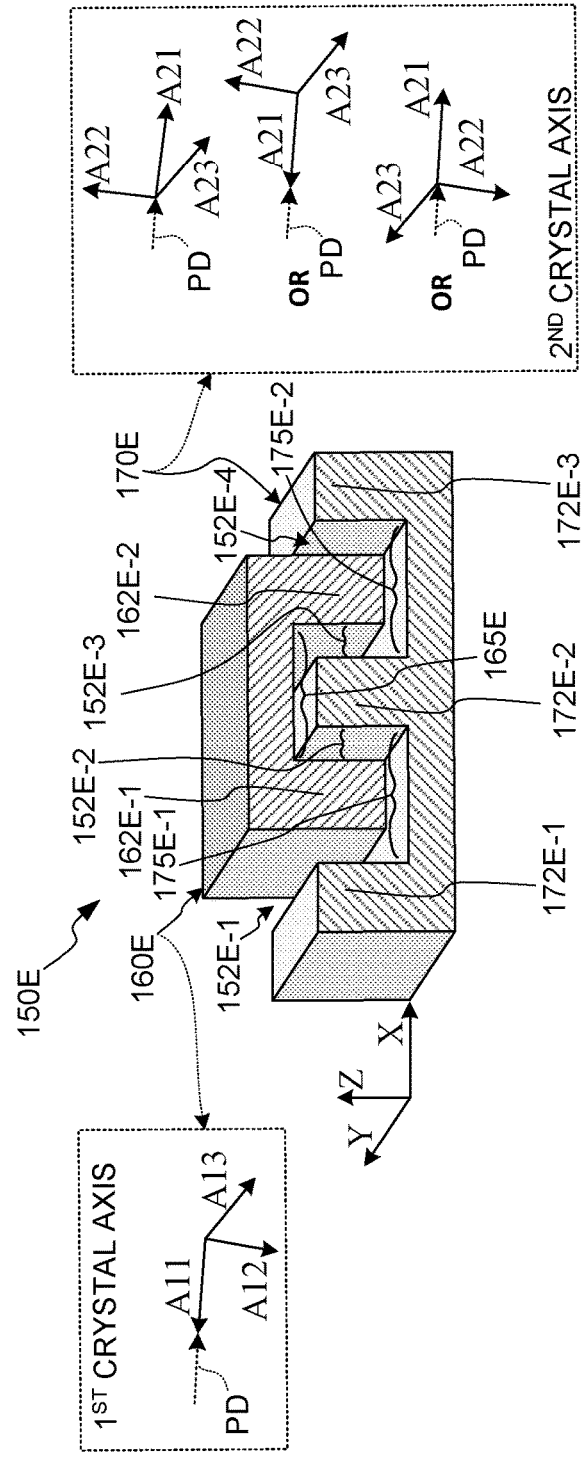
Figure 4A
Figure 4B
Figure 4C

UNITED STATES FREQUENCY CONVERSION USING INTERDIGITATED NONLINEAR CRYSTAL GRATINGS

CROSS REFERENCE TO RELATED APPLICATIONS

This application is a continuation of U.S. patent application Ser. No. 17/555,404, entitled "Frequency Conversion Using Interdigitated Nonlinear Crystal Gratings", which was filed on Dec. 18, 2021, which claims priority from U.S. Provisional Patent Application No. 63/282,706, entitled "Frequency Conversion Using Interdigitated Nonlinear Crystal Gratings", which was filed on Nov. 24, 2021, and is incorporated by reference herein.

This disclosure is related to U.S. Provisional Patent Application No. 63/038,134, entitled "177 nm and 133 nm CW Lasers Using Stacked Strontium Tetraborate Plates", which was filed on Jun. 12, 2020, to U.S. Provisional Patent Application No. 63/076,391, entitled "152 nm and 177 nm CW Lasers Using Stacked Strontium Tetraborate Plates", which was filed on Sep. 10, 2020, and to U.S. patent application Ser. No. 17/239,561, entitled "Frequency Conversion Using Stacked Strontium Tetraborate Plates", which was filed on Apr. 23, 2021. All these applications are incorporated by reference herein.

This application is also related to the following U.S. patent documents, all of which are incorporated by reference herein: U.S. Pat. No. 6,201,601 to Vaez-Iravani et al., U.S. Pat. No. 6,271,916 to Marxer et al., U.S. Pat. No. 7,525,649 to Leong et al., U.S. Pat. No. 7,817,260 to Chuang et al., U.S. Pat. Nos. 8,298,335 and 8,824,514 to Armstrong, U.S. Pat. No. 8,976,343 to Genis, U.S. Pat. No. 9,023,152 to Dribinski, U.S. Pat. Nos. 9,461,435 and 9,059,560 to Dribinski et al., U.S. Pat. Nos. 9,293,882 and 9,660,409 to Chuang, U.S. Pat. Nos. 9,250,178, 9,459,215, 9,509,112, 10,044,166, 10,283,366 and 11,180 866 to Chuang et al.

BACKGROUND OF THE DISCLOSURE

Field of the Disclosure

The present application relates to lasers capable of generating light having deep UV (DUV) or vacuum UV (VUV) wavelengths, and more particularly to lasers capable of generating light in the range of approximately 125 nm to 300 nm and inspection systems that use such lasers to inspect, e.g., photomasks, reticles, and semiconductor wafers.

Related Art

As semiconductor devices' dimensions shrink, the size of the smallest particle or pattern defect that can cause a device to fail also shrinks. Hence a need arises for detecting smaller particles and defects on patterned and unpatterned semiconductor wafers and reticles. The intensity of light scattered by particles smaller than the wavelength of that light generally scales as a high power of the dimensions of that particle (for example, the total scattered intensity of light from an isolated small spherical particle scales proportional to the sixth power of the diameter of the sphere and inversely proportional to the fourth power of the wavelength). Because of the increased intensity of the scattered light, shorter wavelengths will generally provide better sensitivity for detecting small particles and defects than longer wavelengths.

Since the intensity of light scattered from small particles and defects is generally very low, high illumination intensity is required to produce a signal that can be detected in a very short time. Average light source power levels of 0.3 W or more may be required. At these high average power levels, a high pulse repetition rate is desirable as the higher the repetition rate, the lower the energy per pulse and hence the lower the risk of damage to the system optics or the article being inspected. The illumination needs for inspection and metrology are generally best met by continuous wave (CW) light sources. A CW light source has a constant power level, which avoids the peak power damage issues and also allows for images or data to be acquired continuously. However, in many cases, mode-locked lasers (sometimes referred to as quasi-CW lasers) with repetition rates of about 50 MHz or higher may be useful because the high repetition rate means that the energy per pulse can be low enough to avoid damage for certain metrology and inspection applications.

Therefore, a need arises for a mode-locked or CW laser that generates radiation in the VUV range and is suitable for use in inspection of photomasks, reticles, and/or wafers. If a laser enabling mode-locked or CW output at near 133 nm at higher power level can be practically produced, it could enable more accurate and faster inspection and metrology and contribute to cutting-edge semiconductor production.

Furthermore, lasers that generate radiation at DUV wavelengths (such as wavelengths between 190 nm and 300 nm) with high power levels and long intervals between service events (such as months or years) typically use cesium lithium borate (CLBO) as a nonlinear crystal for frequency conversion. However, CLBO is hygroscopic and must be protected from humidity during handling, storage, and operation, resulting in considerable complexity and cost in manufacturing, shipping, and operating processes. Other non-hygroscopic nonlinear crystals with high damage thresholds do not phase match at important wavelengths in the DUV wavelength range and so cannot be used with critical or noncritical phase matching for such wavelengths. Therefore, a need also arises for a mode-locked or CW laser that generates radiation in the DUV range without using hygroscopic nonlinear crystals.

A need also arises for an inspection system and associated laser system that is capable of generating mode-locked or CW laser light having an output at a DUV or VUV wavelength such as in the range of approximately 125 nm to approximately 300 nm and avoids some, or all, of the above problems and disadvantages.

SUMMARY OF THE DISCLOSURE

The present invention generally relates to nonlinear crystal grating assemblies for use in laser assemblies (lasers) that are configured to generate laser output light beam having an output frequency with a corresponding output wavelength in the range of approximately 125 nm to approximately 300 nm. Each nonlinear crystal grating assembly (grating assembly) includes two integral nonlinear crystal grating structures respectively processed to include a row of parallel, spaced-apart mesa-type structures (mesas) that are shaped and configured to facilitate assembly into an interdigitated configuration (e.g., such that the mesas of one grating structure fit into grooves formed between two adjacent mesas of the other grating structure, and vice versa). Both grating structures are also formed (e.g., etched or cut) such that each a width of each mesa is substantially equal to an odd integer multiple of a critical length, measured in the propagation direction of light beam, that is required to achieve quasi-phase-matching (QPM) of the incident light beams and the output frequency of a desired laser output light beam. The grating structures are also formed with crystal axes that are inverted (e.g., with the first optical axes aligned parallel with the propagation direction and the second and third optical axes rotated by substantially 180° with respect to each other) such that the first grating structure has an "upright" (first) crystal axis relative to the "inverted" (second) crystal axis of the second grating structure. When the grating structures are assembled into the interdigitated configuration and the grating assembly is operably positioned to receive one or more incident light beams the incident (intermediate) light beam is substantially parallel to the second optical axes of the first and second crystal axes, the mesas of the two grating structures collectively form a grating pattern in which the light beams alternately pass through upright and inverted mesas (i.e., through the upright mesa of one grating structure, then through an inverted mesa of the other grating structure, then through a second upright mesa of the first grating structure, etc.). By forming and assembling the grating structures in this manner, the grating assembly provides a periodic structure capable of achieving QPM suitable for frequency conversion of applied light, thereby facilitating the generation of DUV and VUV laser light at high power and photon energy levels while avoiding the above-mentioned problems and disadvantages associated with prior art approaches. Moreover, by forming the two grating structures such that the upright and inverted mesas form the desired alternating grating pattern when the two grating structures are disposed in the interdigitated configuration, the present invention greatly simplifies the associated manufacturing and assembly processes, and thus reduces the cost of manufacturing the laser assemblies using the crystal grating assemblies of the present invention.

In one embodiment, each of the grating structures used to form the nonlinear crystal grating assemblies of the present invention comprise single (integral) strontium tetraborate $SrB_4O_7$ (SBO) crystals. SBO crystals exhibit attractive features (e.g., broad transparency range, good damage resistivity and chemical stability, high microhardness, and a high diagonal $d_{33}$ nonlinear optical element value compared to the band-gap value) that avoid many of the above-mentioned problems and disadvantages associated with prior art approaches. In an alternative embodiment, the nonlinear crystal is a lithium triborate $LiB_3O_5$ (LBO), beta barium borate $\beta\text{-}BaB_2O_4$ (BBO), or another nonlinear crystal material that is transparent for input and output frequencies and having at least one nonlinear coefficient that is reasonably large (approximately 1 pm/V or larger). SBO crystals exhibit low birefringence that makes frequency conversion by critical or non-critical phase matching impossible. LBO is widely used for doubling the frequency of an infrared wavelength (such as 1064 nm) to create a second harmonic in the green part of the visible spectrum. LBO has high damage threshold and transmits light at wavelengths as short as about 160 nm. However, the UV refractive indices of LBO are such that critical and noncritical phase matching are not possible for, for example, doubling the frequency of green light at a wavelength near 532 nm. The present invention circumvents the phase-matching limitations of SBO, LBO and other nonlinear crystals by way of using the interdigitated configuration described herein to form grating pattern (i.e., a sequentially aligned periodic series of upright and inverted mesas respectively having the first/upright and second/inverted crystal axes) that achieves QPM of one or more input light frequencies of intermediate light beams directed onto the input surface of the grating assembly at approximately Brewster's angle such that light exiting the output surface of the grating assembly includes laser output light having a desired DUV or VUV output frequency.

In practical embodiments, the grating structures are formed by etching or cutting (ruling) periodically spaced rectangular grooves or cavities in a single piece of nonlinear crystal by means of standard fabrication techniques. The residual nonlinear crystal material between each groove is referred to herein as a mesa or plate, whereby each grating structure consists of a horizontal row of parallel spaced-apart mesas that extend vertically from a horizontal base and are separated by intervening grooves. As mentioned above, the width of each mesa of both grating structures is substantially equal to an odd integer multiple of a critical length to enable QPM of the input light frequency and the desired output frequency. The width of each groove is larger than the width of each mesa such that when the grating structures are assembled into the interdigitated configuration, vertical planar surfaces of the mesas of the first grating structure are separated by small gap distances from opposing vertical planar surfaces of the mesas of the second grating structure. In one embodiment the depth of the rectangular grooves (i.e., the height of each mesa) is at least ten microns, preferably at least 50 μm or at least 100 μm. By forming the grating structures in this manner, the mesas of the two grating structures form an interdigitated alternating grating pattern that facilitates the use of grating assemblies produced in accordance with the present invention to perform frequency conversion (e.g., frequency doubling of one input light frequency or frequency summing of two input light frequencies) that is required to generate DUV and VUV wavelengths at high power levels (i.e., from several hundred milli-watts (mW) to several watts (W) or more) and high photon energy levels (for example 4.66 eV at 266 nm, 7.00 eV at 177 nm, 8.16 eV at 152 nm, and 9.32 eV at 133 nm) while avoiding the above-mentioned problems and disadvantages associated with prior art approaches.

In specifically embodiments described below, the present invention is directed to improvements in inspection systems utilized in the semiconductor fabrication industry, and in particular to laser assemblies for such inspection systems that are capable of generating mode-locked or continuous wave (CW) laser light having a light source power level of 0.3 W or more and having an output wavelength in the range of approximately 125 nm to approximately 300 nm. In a practical embodiment, each nonlinear crystal grating assembly is utilized in a frequency conversion stage of an associated laser assembly that also includes at least one fundamental laser and one or more intermediate frequency conversion stages, where each fundamental laser respectively generates a fundamental light beam having a corresponding fundamental frequency (e.g., having wavelengths between about 1 μm and 1.1 μm), and the intermediate frequency conversion stages are collectively configured to convert the fundamental light beam(s) into at least one intermediate light beam having an associated intermediate frequency. In at least one embodiment, the final frequency conversion stage is configured to direct the intermediate light beam(s) through a grating assembly such that a polarization direction (electric field direction) of the light passing through each crystal mesa (plate) is substantially parallel to one axis of the crystal material (e.g., axis A2), and such that a propagation direction of the light is substantially parallel to another axis of the crystal (e.g., axis A1), whereby the alternating upright/inverted periodic configuration formed by the interdigitated mesas achieves QPM of the intermediate light beam and the output wavelength. In a specific embodiment, the final frequency conversion stage includes multiple mirrors operably configured (e.g., in a bow-tie ring cavity formation) to receive and circulate at least one of the intermediate light beams (e.g., by way of one or more matching lenses) such that a beam waist of the circulated light occurs at (i.e., inside or proximate to) the grating assembly. In one embodiment the final frequency conversion stage utilizes a beam splitter (e.g., SBO crystal, SBO glass, or $CaF_2$ crystal) that is configured to split the exiting light (i.e., light leaving/exiting the grating assembly) such that a reflected (first) portion of the exiting light forms the desired laser output light beam having an output wavelength in the range of approximately 125 nm to approximately 300 nm, and such that the non-reflected (second) portion of the exiting light comprising unconsumed input light is passed by the beam splitter for circulation by the cavity mirrors.

In various disclosed embodiments, the present invention is directed to improved laser assemblies for inspection systems utilized in the semiconductor fabrication industry, and in particular to laser assemblies for such inspection systems that are capable of generating laser light having a light source power level of 0.3 W or more and having an output wavelength in the range of in the range of approximately 125 nm to approximately 300 nm. In some embodiments, a nonlinear crystal grating assembly is configured to frequency-double a single intermediate light beam having a visible wavelength near 532 nm, a UV wavelength near 355 nm or a DUV wavelength near 266 nm to generate laser light having a DUV wavelength near 266 nm, a VUV wavelength near 177 nm, or a VUV wavelength near 133 nm, respectively. In other embodiments, a nonlinear crystal grating assembly is configured to frequency-sum a first intermediate light beam having a UV wavelength near 355 nm with a second intermediate light beam having a DUV wavelength near 266 nm to generate laser light having a VUV output wavelength near 152 nm. In other embodiments disclosed herein, a nonlinear crystal grating assembly is configured to frequency-sum a first intermediate light beam having visible wavelength near 532 nm with a second intermediate light beam having a DUV wavelength near 213 nm to generate laser light having a VUV wavelength near 152 nm. In yet another alternative embodiment, a nonlinear crystal grating assembly is configured to frequency-sum a first intermediate light beam having a visible wavelength near 532 nm with a second intermediate light beam having a DUV wavelength near 266 nm to generate CW laser light having a VUV output wavelength near 177 nm. In all the above-mentioned embodiments, the integral nonlinear crystal grating structures forming the nonlinear crystal grating assembly are fabricated to include mesas having mesa widths substantially equal to an odd integer multiple of an associated QPM critical length for the input and output light frequencies.

In accordance with another embodiment, a laser assembly is configured to generate laser output light with an output wavelength of approximately 133 nm by creating an eighth harmonic of a fundamental frequency by configuring the final frequency conversion stage to double a fourth harmonic of the fundamental frequency using a nonlinear crystal grating assembly of the present invention.

In accordance with another embodiment, a laser assembly is configured to generate laser output light with an output wavelength of approximately 177 nm by creating a sixth harmonic of a fundamental frequency by configuring the final frequency conversion stage to double a third harmonic of the fundamental frequency using a nonlinear crystal grating assembly of the present invention.

In accordance with another embodiment, a laser assembly is configured to generate laser output light with an output wavelength of approximately 266 nm by creating a fourth harmonic of a fundamental frequency by configuring the final frequency conversion stage to sum two second harmonics (or double a single second harmonic) of the fundamental frequency using a nonlinear crystal grating assembly of the present invention.

In accordance with another embodiment, a laser assembly is configured to generate laser output light with an output wavelength of approximately 152 nm by creating a seventh harmonic of a fundamental frequency by configuring the final frequency conversion stage to sum third and fourth harmonics of the fundamental frequency using a nonlinear crystal grating assembly of the present invention.

In accordance with another embodiment, a laser assembly is configured to generate laser output light with an output wavelength of approximately 152 nm by configuring the final frequency conversion stage to sum second and fifth harmonics of a fundamental frequency using a nonlinear crystal grating assembly of the present invention.

In accordance with another embodiment, a laser assembly is configured to generate laser output light with an output wavelength of approximately 177 nm by configuring the final frequency conversion stage to sum second and fourth harmonics of a fundamental frequency using a nonlinear crystal grating assembly of the present invention.

In other embodiments, an inspection system is configured to inspect a sample such as a wafer, reticle or photomask using one of the lasers described herein that generates an output wavelength of, for example, approximately 266 nm, 177 nm, 152 nm or approximately 133 nm.

BRIEF DESCRIPTION OF THE DRAWINGS

FIGS. 4A, 4B and 4C are perspective views showing exemplary integral nonlinear crystal grating structures and an exemplary simplified nonlinear crystal grating assembly formed by the integral nonlinear crystal grating structures for use in the final frequency conversion stages of a laser assembly.

DETAILED DESCRIPTION OF THE DRAWINGS

Figure 1:
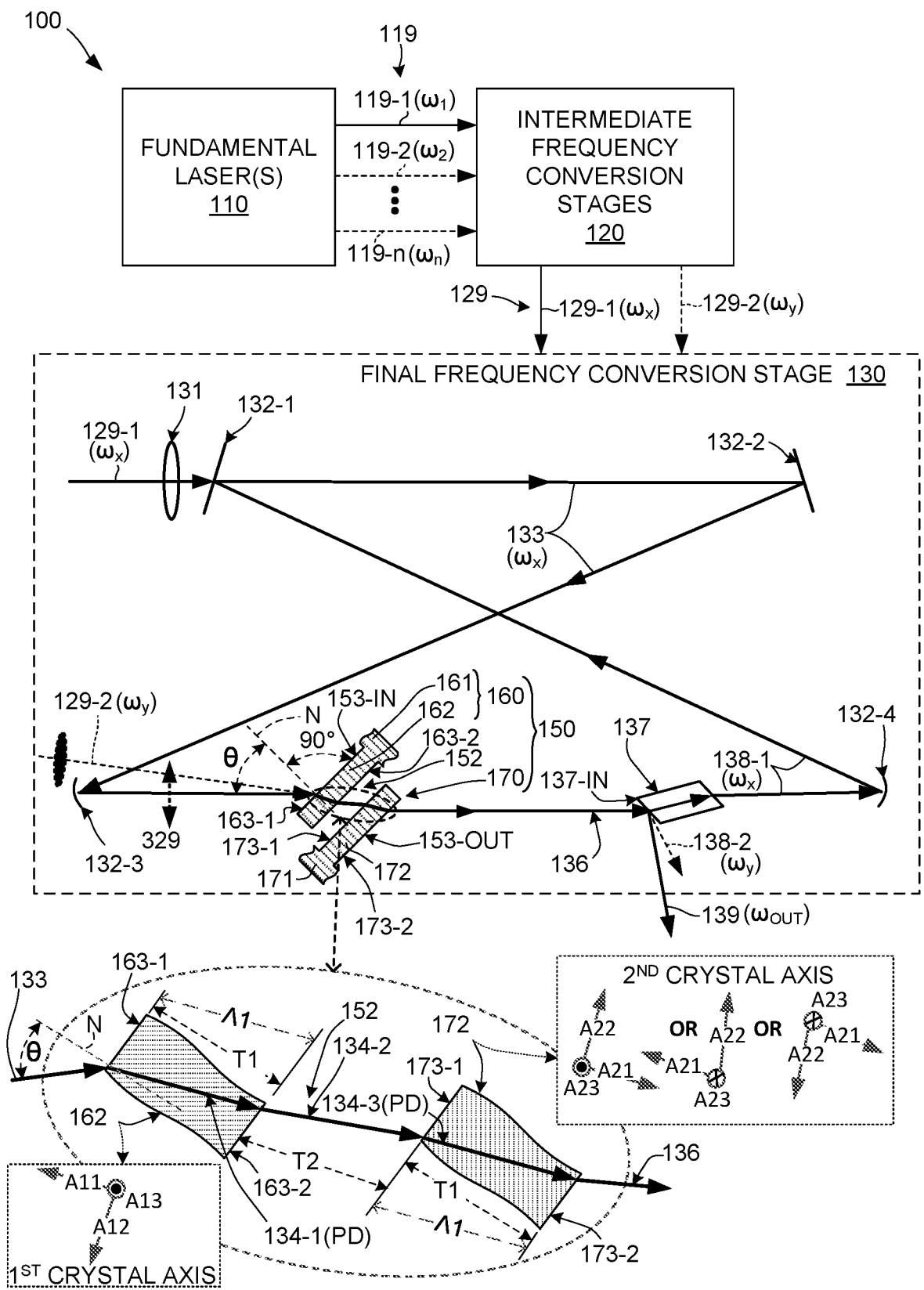
FIG. 1 is a simplified block diagram showing an exemplary laser assembly according to a generalized exemplary embodiment of the present invention.

The present invention relates to an improvement in lasers for semiconductor inspection systems. The following description is presented to enable one of ordinary skill in the art to make and use the invention as provided in the context of a particular application and its requirements. As used herein, directional terms such as "top", "left", "right", "horizontal", "vertical" and "downward" are intended to provide relative positions for purposes of description and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described but is to be accorded the widest scope consistent with the principles and novel features herein disclosed.

Second-order susceptibility variation in acentric crystals leads to modification of the quasi-phase-matching (QPM) conditions which can be useful for frequency conversion. For the VUV spectral region below about 150 nm, there is not yet a known transparent optical crystal that combines non-zero second order nonlinearity with sufficient birefringence. Some attempts to fabricate QPM structures have been reported, for instance, by electric-field poling of the ferroelectric $BaMgF_4$ which has mm2 symmetry (E. G. Villora, K. Shimamura, K. Sumiya, and H. Ishibashi, "Birefringent- and quasi phase-matching with $BaMgF_4$ for vacuum-UV/UV and mid-IR all solid-state lasers," Opt. Express 17, 12362 (2009)), or by mechanical twinning of crystalline quartz ($SiO2$) which has trigonal 32 symmetry (S. Kurimura, M. Harada, K. Muramatsu, M. Ueda, M. Adachi, T. Yamada, and T. Ueno, "Quartz revisits nonlinear optics: twinned crystal for quasi-phase matching [Invited]," Opt. Mat. Express 1, 1367 (2011)); however, both materials exhibit low nonlinear coefficients and the shortest wavelength demonstrated so far is 194 nm.

Strontium tetraborate $SrB_4O_7$ (SBO) crystallizes in the orthorhombic system, point group mm2, space group $Pnm2_1$, with unit cell dimensions a=4.4255 Å, b=10.709 Å, and c=4.2341 Å (Y. S. Oseledchik, A. L. Prosvirnin, A. I. Pisarevskiy, V. V. Starshenko, V. V. Osadchuk, S. P. Belokrys, N. V. Svitanko, A. S. Korol, S. A. Krikunov, and A. F. Selevich, "New nonlinear optical crystals: strontium and lead tetraborates," Opt. Mater. 4, 669 (1995)). All boron atoms are coordinated tetrahedrally and an oxygen atom is common to three tedrahedra. Despite the three-dimensional network of tetrahedral, the borate network appears as a layer-like structure since there are relatively fewer links in the c direction of the unit cell.

SBO exhibits very small birefringence (<0.005) and is not ferroelectric. Non-phase-matched second-harmonic generation (SHG) has been implemented using SBO for diagnostics, but the efficiency is extremely low when only one coherence length is utilized and a practical detection limit was estimated to be 2μJ for 120 fs pulses at 267 nm (V. Petrov, F. Noack, D. Shen, F. Pan, G. Shen, X. Wang, R. Komatsu, and V. Alex, "Application of the nonlinear crystal $SrB_4O_7$ for ultrafast diagnostics converting to wavelengths as short as 125 nm," Opt. Lett. 29, 373 (2004)).

SBO exhibits unique optical and mechanical properties. The transparency range of SBO is 130-3200 nm in wavelength (Y. S. Oseledchik et al., op. cit.). SBO also exhibits a high (1.5-3.5 μm/V) value of the diagonal $d_{33}$ element (compared to the band-gap value). The optical damage threshold is very high (approximately 15 $GW/cm^2$) compared with other materials such as $MgF_2$. The microhardness of SBO is also high (1750 $kg/mm^2$ in the x direction, 1460 $kg/mm^2$ in the y direction and 1350 $kg/mm^2$ in the z direction). The high optical damage threshold and microhardness allow SBO crystals to withstand extreme conditions when exposed to DUV and VUV radiation. DUV and VUV lasers may have high power levels from several milli-watts (mW) to several watts (W) or more, and high photon energy (for example, 9.32 eV at 133 nm and 8.16 eV at 152 nm). The broad transparency range, the good damage resistivity and chemical stability, and high value of the diagonal $d_{33}$ element are features that make SBO very attractive for frequency conversion to generate DUV and VUV wavelengths. However, the low birefringence means that frequency doubling by critical or non-critical phase matching are not possible.

Trabs et al. (P. Trabs, F. Noack, A. S. Aleksandrovsky, A. I. Zaitsev, N. V. Radionov, and V. Petrov, "Spectral fringes in non-phase-matched SHG and refinement of dispersion relations in the VUV", Opt. Express 23, 10091 (2015)) reported using an SBO crystal to generate second harmonics in the VUV from ultrashort laser pulses through random quasi phase matching. The second harmonic generation method described by Trabs et al. is unsuitable for a light source semiconductor metrology and inspection systems because the frequency conversion process has low efficiency making it impractical to use this method to generate Watts of second harmonic laser power, and also because it requires ultrashort laser pulses.

Lithium triborate $LiB_3O_5$ (LBO) crystallizes in the orthorhombic system, point group mm2, space group $Pna2_1$, with unit cell dimensions a=8.4473 Å, b=7.3788 Å, and c=5.1395 Å (C. Chen, Y. Wu, A. Jiang, B. Wu, G. You, R. Li, and S. Lin, "New nonlinear optical crystal: $LiB_3O_5$," J. Opt. Soc. Am. B 6, 616-621 (1989)). The optical damage threshold is high (45$GW/cm^2$ for 1.1 ns pulses at 1064 nm), and it is transparent over a broad wavelength range from 160 nm to 2.6 μm. The largest nonlinear optical coefficients are $d_{31}$ (approximately −1.1 μm/V) and $d_{32}$ (approximately 1.2 μm/V). The diagonal nonlinear optical coefficient $d_{33}$ is much smaller and is less useful for nonlinear frequency conversion. LBO is biaxially birefringent and can generate, for example, the second and third harmonics of a wavelength near 1.064 μm by critically or noncritically phase-matched second harmonic and sum frequency generation. However, LBO is not suitable for generating DUV and VUV wavelengths such as 266 nm or 177 nm by either critical or noncritical phase matching.

FIG. 1 shows a laser assembly 100 for generating a laser output light beam 139 having an output frequency $\omega_{out}$ with a corresponding wavelength in the range of approximately 125 nm to approximately 300 nm. Laser assembly 100 generally includes one or more fundamental lasers 110, one or more intermediate frequency conversion stages 120 and a final frequency conversion stage 130.

Referring to the upper left portion of FIG. 1, fundamental lasers 110 are respectively configured to generate fundamental light beams 119-1, 119-2 . . . 119-n (collectively indicated as 119) having corresponding fundamental angular frequencies $\omega_1$ to $\omega_2$, where each frequency has a corresponding fundamental wavelength between about 1 μm and 1.1 μm. In some embodiments all fundamental light beams 119 have substantially the same wavelength (e.g., fundamental frequency $\omega_1$ is substantially equal to fundamental frequency $\omega_2$). Specific fundamental laser types are mentioned in the specific embodiments provided below. Note that in the following description, where a wavelength is mentioned without qualification, that wavelength may be assumed to be the wavelength in vacuum.

Intermediate frequency conversion stages 120 are optically coupled to receive one or more of fundamental light beams 119 (or light from an associated intermediate frequency conversion stage) and are collectively configured to generate one or more intermediate light beams 129. In some specific embodiments intermediate light beams 129 comprise a single (first) intermediate light beam 129-1 having an associated intermediate frequency $\omega_x$. In other specific embodiments intermediate light beams 129 include both intermediate light beam 129-1 and a second intermediate light beam 129-2 having an associated intermediate frequency $\omega_y$. FIG. 1 is not intended to limit the appended claims such that all intermediate frequency conversion stages 120 are required to receive a fundamental light beam 119. For example, in the specific examples below set forth below, a given "downstream" intermediate frequency conversion stage may receive second, third or fourth harmonic light generated by one or more "upstream" intermediate frequency conversion stages that is/are optically coupled between a fundamental laser 110 and the given downstream stage.

Referring to the lower half of FIG. 1, laser assembly 100 also includes a final frequency conversion stage 130 configured to pass intermediate light beams 129 ($\omega_x$ or $\omega_x$ and $\omega_y$) through a nonlinear crystal grating assembly 150, and to direct laser output light beam 139 out of laser assembly 100 for use, e.g., in one or more of the inspection systems described below with reference to FIGS. 8-10. In one embodiment, intermediate light beam 129-1, which has a frequency $\omega_x$ as described in the specific embodiments set forth below, enters a bow-tie ring cavity formed by an input coupler mirror 132-1, a flat mirror 132-2, two curved mirrors 132-3 and 132-4, grating assembly 150 and a beam splitter 137. For descriptive purposes, a portion of the light transmitted by the bow-tie ring cavity from input/coupler mirror 132-1 to grating assembly 150 is indicated as circulated light portion 133, which is composed of both intermediate light beam 129-1 and unconsumed circulated light portion 138-1 (generated as described below), where both light portions 133 and 138-1 have frequency $\omega_x$. The bow-tie ring cavity formed by mirrors 132-1 to 132-4 is configured such that light portion 133 is directed along an optical path that passes through grating assembly 150. In one embodiment, a mode matching lens 131 is utilized to focus intermediate light beam 129-1 though input coupler/mirror 132-1, and the bow-tie ring cavity formed by mirrors 132-1 to 132-4 is otherwise configured such that light portion 133 is a beam waist of light portion 133 (i.e., including intermediate light beam 129-1) that occurs at (i.e., inside or proximate to) grating assembly 150. When intermediate light beam 129-2 having frequency $\omega_y$ is used as described in relevant specific embodiments set forth below, intermediate light beam 129-2 enters the bow-tie ring cavity passing close to (but not necessarily through) curved mirror 132-3 such that it is directed substantially at selected angle θ onto input surface 153-IN and passes through grating assembly 150. As illustrated in this exemplary arrangement, final frequency conversion stage 130 is configured to pass intra-crystal light 134 (i.e., only light portion 133, or both light portion 133 and intermediate light beam 129-2) through grating assembly 150, with exiting light 136 (i.e., the total light exiting grating assembly 150) being directed onto an input surface 137-IN of a beam splitter 137. Beam splitter 137 is configured to split exiting light 136 such that unconsumed input light 138-1 having frequency $\omega_x$ is passed to mirror 132-4 for recirculation within the bow-tie cavity and such that laser output light 139 having output frequency $\omega_{OUT}$ is directed out of laser assembly 100. As indicated, in some embodiments beam splitter 137 is also configured to reflect unconsumed input light 138-2 having frequency $\omega_y$ out of the bow-tie cavity. Beam splitter 137 may be implemented using one of a single SBO crystal, SBO glass or a $CaF_2$ crystal. Note that when final frequency doubling stage 130 is used in a pulsed laser, no cavity is needed (i.e. mirrors 132-1, 132-2, 132-3 and 132-4 may be omitted), and intermediate light beam 129-1 may be directed to, and focused in or proximate to, input surface 153-IN of grating assembly 150 by any suitable combination of lenses and/or mirrors.

Nonlinear crystal grating assembly 150 includes an integral nonlinear crystal grating structure 160 and an integral nonlinear crystal grating structure 170 that are fixedly connected to each other (e.g., by way of an external frame, not shown) in an interdigitated configuration. As described in additional detail below, each integral nonlinear crystal grating structure (grating structure) 160 and 170 includes multiple parallel spaced-apart mesas (plates), but for clarity and to simplify the following description, each of grating structures 160 and 170 is depicted in FIG. 1 using only one mesa. Specifically, grating structure 160 includes a mesa 162 that is integrally connected to and protruding (extending) from a base 161, and grating structure 170 includes a mesa 172 that is integrally connected to and protruding from a base 171. As used herein, the term "integral" and the phrase "integrally connected" are used to describe grating structures formed by removing material from or otherwise processing a single nonlinear crystal (e.g., both base 161 and mesa 162 are parts of a single SBO crystal). In practical embodiments, as described below with reference to FIGS. 4C and 6C, each of grating structures 160 and 170 include multiple interdigitated mesas that are integrally connected to and extend from bases 161 and 171, respectively. As used herein, the phrase "interdigitated configuration" means that grating structure 160 is disposed with respect to grating structure 170 such that the mesas of grating structure 160 extend into spaces disposed between the mesas of grating structure 170, whereby light alternately passes through an interdigitated alternating grating pattern formed by aligned portions of the interdigitated mesas of grating structures 160 and 170 (for further clarity see the embodiment described below with reference to FIG. 5).

As described in additional detail below, mesas 162 and 172 are rectangular structures having opposing planar input and output surfaces through which light beam 133 is passed during operation. Referring to the bubble section at the bottom of FIG. 1, light beam 133 is directed onto planar input surface 163-1, a first intra-crystal light portion 134-1 passes through mesa 162, a second intra-crystal light portion 134-2 exiting through output surface 163-2 passes through an intervening space 152 onto planar input surface 173-1, a third intra-crystal light portion 134-3 passes through mesa 172 and exiting light 136 is transmitted out of grating assembly 150 by way of output surface 173-2. In one embodiment the input/output surfaces of the outermost mesas form input/output surfaces for grating assembly 150. Because the simplified example shown in FIG. 1 only includes two mesas, input surface 163-1 of mesa 162 serves as input surface 153-IN of grating assembly 150, and output surface 173-2 of mesa 172 serves as output surface 153-OUT of grating assembly 150 (in practical embodiments the grating assembly input and output surfaces would not occur on adjacent mesas). Accordingly, when grating structures 160 and 170 are disposed in the requisite interdigitated configuration and grating assembly 150 is otherwise operably arranged within final conversion stage 130, light passes through grating assembly 150 by striking input surface 153-IN, passing through mesas 162 and 172 and an intervening gap 152, and then exiting grating assembly 150 through output surface 153-OUT.

Nonlinear crystal grating assembly 150 achieves QPM of incident light (e.g., beam 133 and/or beam 129) when grating structures 160 and 170 are formed with mesas having a proper width in light propagation direction PD, and when grating structures 160 and 170 are formed with inverted crystal axes that are aligned as described below with respect to the light propagation direction PD and a polarization direction 329 of the incident light. Referring to the bubble section in FIG. 1, both grating structure 160 and grating structure 170 are fabricated such that each mesa 162 and 172 has a width T1 (e.g., a distance between input surfaces 163-1/173-1 and output surfaces 163-2/173-2) substantially equal to an odd integer multiple of a critical length Λ1 measured in a propagation direction PD of intermediate light beams 129/133. Critical length Λ1 is described in additional detail below with reference to FIGS. 4A-4C. As also indicated in the bubble section, the crystal material used to form grating structure 160 includes an associated first crystal axis (indicated by optical axes A11, A12 and A13), and the crystal material used to form grating structure 170 includes an associated second crystal axis (indicated by optical axes A21, A22 and A23). To achieve QPM, the first optical axes A11 and A21 of both grating structures 160 and 170 are aligned parallel to light propagation direction PD and both second optical axes A12 and A22 are aligned parallel to light polarization direction 329. In addition, as mentioned above, the first and second crystal axes of grating structures 160 and 170 are inverted (rotated 180° relative to each other). For descriptive purposes, the term "upright" is assigned to indicate the arbitrarily selected first crystal axis A11/A12/A13 depicted in FIG. 1 that meets the optical axis orientation requirements (i.e., with optical axis A11 aligned parallel to light propagation direction PD and optical axis A12 parallel to light polarization direction 329). In contrast, the term "inverted" is assigned to the three possible orientations of second crystal axis A21/A22/A23 that are both rotated 180° relative to first crystal axis A11/A12/A13 and meet the optical axis orientation requirements (i.e., in each of the three orientations optical axis A21 is aligned parallel to light propagation direction PD and optical axis A22 parallel to light polarization direction 329). Note that grating structure 160 may be formed using any of the three crystal axis orientations A21/A22/A23 shown in FIG. 1, and therefore the terms "upright" and "inverted" are assigned arbitrarily and solely used to indicate the 180° rotation between first crystal axis A11/A12/A13 and second crystal axis A21/A22/A23. When grating structures 160 and 170 are formed in the manner described above and disposed in the interdigitated configuration, mesas 162 and 172 (along with intervening gap 152) collectively form a periodic structure that achieves quasi-phase-matching (QPM) of intermediate light beams 129 with laser output 139 (i.e., between $\omega_{OUT}$ and frequency $\omega_x$, as described in the specific examples set forth below, or both frequencies cox and $\omega_y$, as described in some of the specific examples set forth below) such that light portion 136 exiting output surface 153-OUT of nonlinear crystal grating assembly 150 includes laser output light beam 139 having a desired output frequency $\omega_{OUT}$.

Figure 2A:
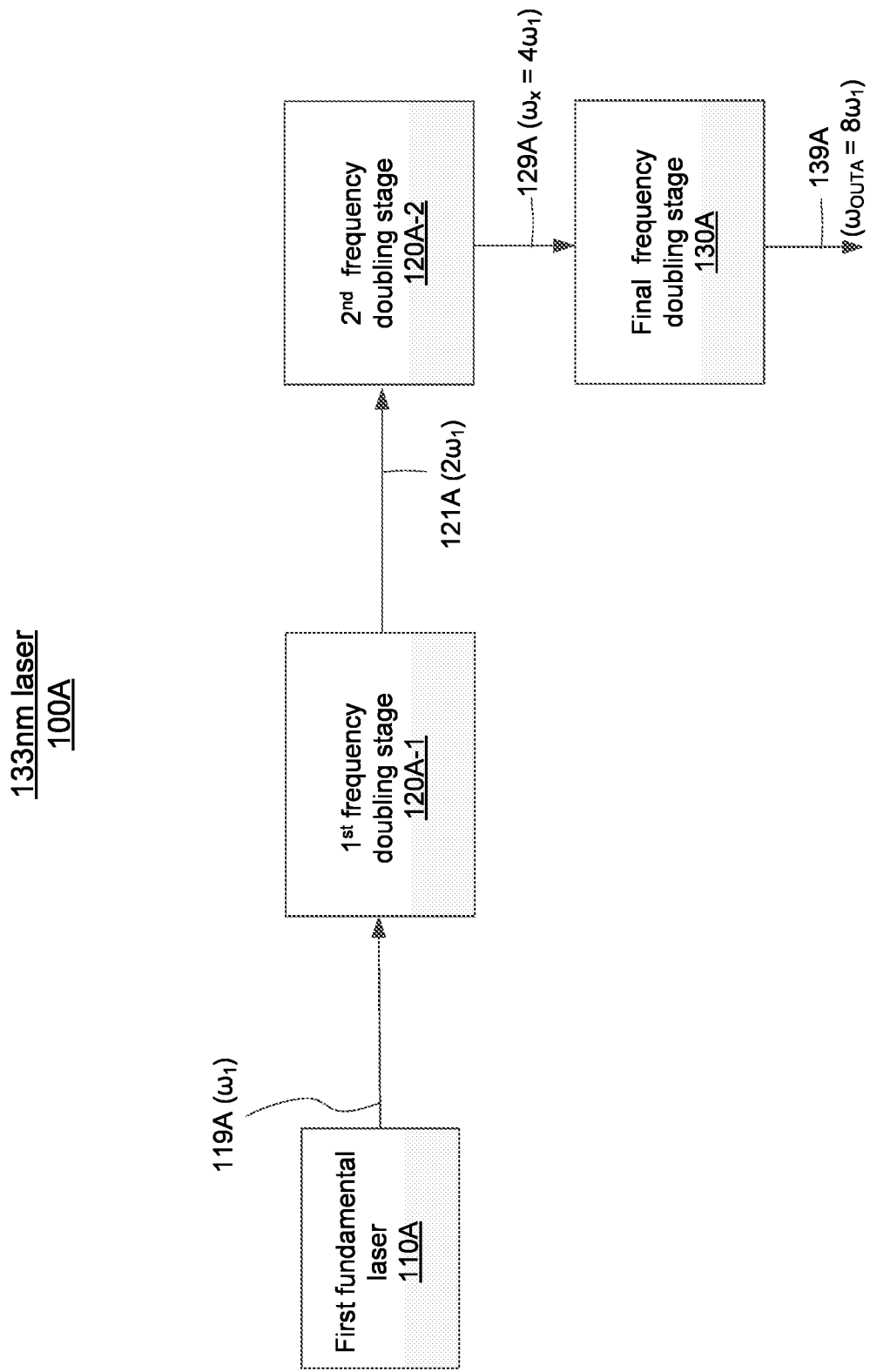
FIGS. 2A and 2B are simplified block diagrams respectively showing simplified laser assemblies according to first and second specific embodiments of the present invention.

FIG. 2A is a simplified block diagram showing an exemplary laser assembly 100A configured to generate a wavelength in the range of approximately 128 nm to approximately 134 nm (e.g., approximately 133 nm) according to a first specific exemplary embodiment of the present invention. Laser assembly 100A comprises a first fundamental laser 110A and three frequency doubling (conversion) stages (i.e., two intermediate frequency doubling stages 120A-1 and 120A-2, and a final frequency doubling stage 130A) that are cooperatively configured to generate laser output light having a wavelength in the range of approximately 128 nm to approximately 134 nm. The first fundamental laser 110A is configured to generate fundamental light 119A having a first fundamental wavelength in the range of approximately 1000 nm to approximately 1100 nm (i.e., between about 1 µm and 1.1 µm) and a corresponding first fundamental frequency $\omega_1$. First intermediate frequency doubling stage 120A-1 receives the first fundamental light 119A and generates the second harmonic light 121A with a second harmonic frequency $\omega_1$ equal to twice the first fundamental frequency $\omega_1$. Second intermediate frequency doubling stage 120A-2 receives the second harmonic light 121A and generates an intermediate light beam 129A as fourth harmonic light with the fourth harmonic frequency $4\omega_1$ equal to four times the first fundamental frequency $\omega_1$. Final (third) frequency doubling stage 130A receives the fourth harmonic light (intermediate light beam) 129A and generates laser output light 139A with an output frequency $\omega_{OUT4}$ that is equal to eight times the first fundamental frequency $\omega_1$.

Referring to FIG. 2A, the first fundamental laser 110A is configured using known techniques to generate the first fundamental light 119A (referred to simply as the "fundamental" in the industry) at first fundamental frequency $\omega_1$. In one embodiment, the first fundamental laser 110A is configured such that the first fundamental light 119A is generated at a first fundamental frequency $\omega_1$ corresponding to an infra-red wavelength of approximately 1064 nm. In an exemplary embodiment, the first fundamental laser 110A is implemented using one of a Nd:YAG (neodymium-doped yttrium aluminum garnet) lasing medium, a Nd-doped yttrium orthovanadate (Nd:YVO$_4$) lasing medium, or an ytterbium-doped fiber lasing medium. Suitable fundamental lasers are commercially available from Coherent Inc., IPG Photonics Corporation, Trumpf GmbH and other manufacturers. Such manufacturers also sell lasers generating light having a wavelength near 532 nm, i.e., the laser includes first fundamental laser 110A and the first frequency doubling stage 120A-1. In order to generate sufficient light at a wavelength of approximately 133 nm for inspecting semiconductor wafers or reticles, first fundamental laser 110A should generate tens or hundreds of Watts or more of fundamental light 119A.

According to an exemplary embodiment in FIG. 2A, each of the frequency doubling stages 120A-1 and 120A-2 comprises an external resonant cavity including at least three optical mirrors and a nonlinear crystal arranged therein, respectively. The cavities can be stabilized with standard PDH (Pound-Drever-Hall), HC (Hänsch-Couillaud) or other locking techniques. The cavity length is adjusted to maintain resonance by adjusting the position of a mirror or prism through a control signal. The first frequency doubling stage 120A-1 receives and converts first fundamental light 119A at the first fundamental frequency $\omega_1$ to generate the second harmonic light 121A at two times the first fundamental frequency ($2\omega_1$). Second frequency doubling stage 120A-2 receives and converts second harmonic light 121A to generate fourth harmonic light 129A at four times the first fundamental frequency ($4\omega_1$).

In some other embodiments (not shown), the first frequency doubling module may be combined with the first fundamental laser to use intra-cavity frequency doubling with the NLO crystal placed inside the fundamental solid-state laser cavity to generate the second harmonic light 121A.

In at least one embodiment, the first frequency doubling stage 120A-1 in FIG. 2A that generates the second harmonic light 121A can include a Lithium triborate (LBO) crystal, which can be substantially non-critically phase-matched (for an appropriate choice of crystal plane) at temperatures between room temperature and about 200° C. for producing a second harmonic in a wavelength range between about 515 nm and about 535 nm. In alternative embodiments, the first frequency doubling stage 120A-1 may include a Cesium Lithium Borate (CLBO) crystal or a beta-Barium Borate (BBO) crystal, either of which can be critically phase matched for generating a second harmonic in a wavelength range between about 515 nm and about 535 nm. In other alternative embodiments, the first frequency doubling stage 120A-1 may include a $KTiOPO_4$ (KTP), periodically poled lithium niobate (PPLN), periodically poled stoichiometric lithium tantalate (PPSLT), or other nonlinear crystal for frequency conversion.

The second frequency doubling stage 120A-2 that generates the fourth harmonic may use critical phase matching in CLBO, BBO or other nonlinear crystal. In preferred embodiments, the second frequency doubling stage 120A-2 includes a hydrogen-treated or deuterium-treated CLBO crystal.

In an alternative embodiment, the second frequency doubling stage 120A-2 that generates the fourth harmonic may include a nonlinear crystal grating assembly of the type described herein to implement QPM. In one embodiment, the grating assembly is formed using SBO crystal. The critical length for QPM for generating light having a wavelength of 266 nm from light having a wavelength of 532 nm in SBO is approximately 2.59 µm (i.e. in a range from 2.5 µm to 2.7 µm) when the nonlinear crystal is configured so that the polarizations of both the input and output light are parallel to the c axis of the SBO crystal to take advantage of the large $d_{33}$ nonlinear optical coefficient. Since the critical length is longer than the critical lengths for generating shorter wavelengths, the SBO mesa thickness in the light propagation direction may be equal to the critical length or may be equal to a small, odd integer (such as between 3 and 19) times the critical length. In another embodiment, the grating assembly is composed of LBO crystal. The critical length for QPM for generating 266 nm from 532 nm in LBO is approximately 3.81 µm (i.e. in a range from 3.78 µm to 3.84 µm) when the polarization of the input light having a wavelength of 532 nm is parallel to the b axis and the polarization of the output light having a wavelength of 266 nm is parallel to the c axis of the LBO crystal.

Further details of how a fourth harmonic of a CW fundamental IR laser can be generated with high power, low noise, and good stability, can be found in U.S. Pat. Nos. 9,293,882 and 9,660,409, to Chuang, and U.S. Pat. Nos. 9,509,112 and 10,044,166 to Chuang et al. These patents are incorporated herein by reference.

Referring to FIG. 2A, the final frequency doubling stage 130A receives the fourth harmonic light 129A and generates the eighth harmonic light 139A with the eighth harmonic frequency $8\omega_1$ equal to eight times the first fundamental frequency $\omega_1$. In at least one embodiment, the final frequency doubling stage 130A in FIG. 2A that generates the eighth harmonic light 139A can include a nonlinear crystal grating assembly of the type described herein comprising an interdigitated grating configuration to achieve QPM. Any of the frequency conversion stages may be enclosed in one or more protective environments, such as those described in U.S. Pat. No. 8,298,335, entitled "Enclosure for controlling the environment of optical crystals", by Armstrong. This patent is incorporated by reference herein. In particular, since the final frequency doubling stage 130A generates a VUV wavelength, this stage needs to be in an environment with very low oxygen and water concentrations (preferably a few ppm or lower concentrations). Preferably the final frequency doubling stage is kept in an environment that is purged with pure nitrogen or argon. Note that a single protective environment may enclose multiple stages or a single stage.

Any of the frequency conversion stages may incorporate any of the methods or systems described in U.S. Pat. Nos. 9,461,435 and 9,059,560, both entitled "Alleviation of laser-induced damage in optical materials by suppression of transient color centers formation and control of phonon population", to Dribinski et al., any of the apparatus or methods described in U.S. Pat. No. 8,824,514, entitled "Measuring crystal site lifetime in a non-linear optical crystal", to Armstrong, and any of the apparatus and methods described in U.S. Pat. No. 8,976,343, entitled "Laser crystal degradation compensation" to Genis. All of these patents are incorporated herein by reference.

Further note that any of the intermediate frequency conversion stages mentioned herein may advantageously use deuterium, hydrogen and/or fluorine doped or treated nonlinear crystals. Such crystals may be created, processed or treated by any of the processes or methods described in U.S. Pat. No. 9,023,152 to Dribinski, U.S. Pat. Nos. 9,250,178, 9,459,215 and 10,283,366 to Chuang et al., and Published U.S. Patent Application 2014/0305367, entitled "Passivation of Nonlinear Optical Crystals", and filed on Apr. 8, 2014 by Dribinski et al. These patents and applications are incorporated herein by reference. The doped or treated crystals may be particularly useful in those stages involving deep UV wavelengths, including the second frequency doubling stage 120A-2 in FIG. 2A.

Figure 2B:
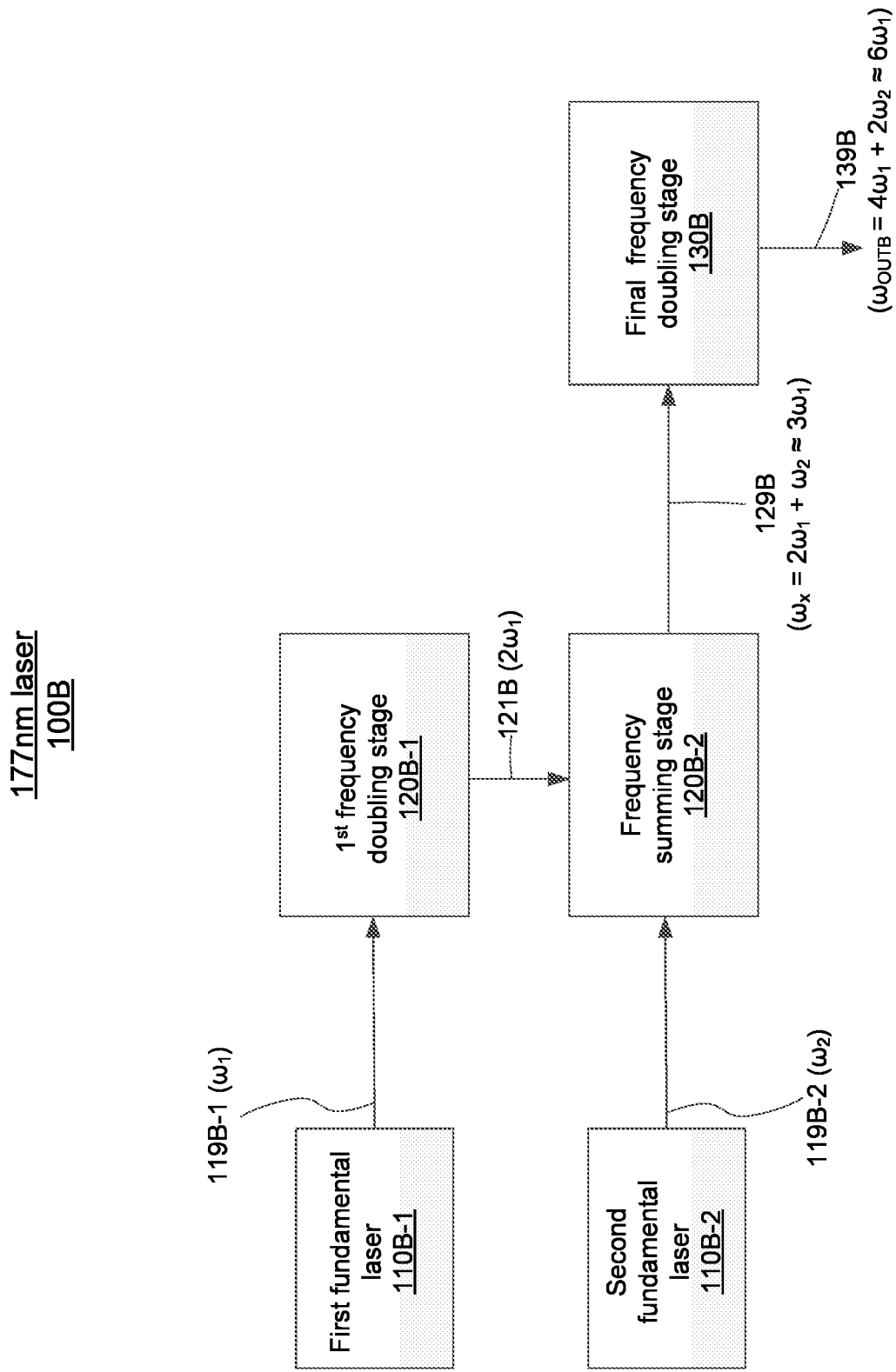

FIG. 2B is a simplified block diagram showing an exemplary laser assembly 100B configured to generate a wavelength in the range of approximately 170 nm to approximately 180 nm (e.g., approximately 177 nm) according to a second specific embodiment of the present invention. Laser assembly 100B comprises a first fundamental laser 110B-1, a second fundamental laser 110B-2, a frequency doubling (conversion) stage 120B-1, a frequency summing (conversion) stage 120B-2, and a final frequency doubling stage 130B that are collectively configured to generate laser output light 139B with an output frequency $\omega_{OUTS}$ having a wavelength in the range of approximately 170 nm to approximately 180 nm. The first fundamental laser 110B-1 is configured to generate fundamental light 119B-1 having a first fundamental wavelength in the range of approximately 1000 nm to approximately 1100 nm (i.e., between about 1

μm and 1.1 μm) and a corresponding first fundamental frequency $\omega_1$. The second fundamental laser 110B-2 is configured to generate fundamental light 119B-2 having a second fundamental wavelength in the range of approximately 1000 nm to approximately 1100 nm (i.e., between about 1 μm and 1.1 μm) and a corresponding second fundamental frequency $6\omega_2$. Frequency doubling stage 120B-1 receives the first fundamental light 119B-1 and generates the second harmonic light 121B with a second harmonic frequency $2\omega_1$ equal to twice the first fundamental frequency $\omega_1$. Frequency summing stage 120B-2 sums the second harmonic 121B with the second fundamental light 119B-2 and generates intermediate light beam 129B having summing frequency $2\omega_1+\omega_2$. If the frequencies of the first fundamental laser 110B-1 and the second fundamental laser 110B-2 are the same ($\omega_1=\omega_2$), the intermediate light beam 129B is the third harmonic ($3\omega_1$ or $3\omega_2$) of the fundamental light. Final frequency doubling stage 130B receives the intermediate light beam 129B and generates final output light 139B with output frequency $\omega_{OUTB}$ equal to twice the summing frequency $2\omega_1+\omega_2$, i.e. equal to $4\omega_1+2\omega_2$. If the frequencies of the first fundamental laser 110B-1 and the second fundamental laser 110B-2 are the same ($\omega_1=\omega_2$), then output frequency $\omega_{OUTB}$ of final laser output light 139B is the sixth harmonic ($6\omega_1$ or $6\omega_2$) of the fundamental light.

Referring to FIG. 2B, the first and second fundamental lasers 110B-1 and 110B-2 are configured as described above with reference to fundamental laser 110A in FIG. 2A. In an alternative embodiment, second fundamental laser 110B-2 may be omitted, and the output of first fundamental laser 110B-1 may be divided into two portions: a first portion directed to first frequency doubling stage 120B-1, and a second portion directed to frequency summing stage 120B-2 along with second harmonic light 121B. In this alternative embodiment, necessarily $\omega_2=\omega_1$.

According to the exemplary embodiment in FIG. 2B, the first frequency doubling stage 120B-1 is configured as described above with reference to stages 120A-1 and 120A-2 of FIG. 2A.

In one embodiment, frequency summing stage 120B-2 sums the second harmonic 121B with the second fundamental light 119B-2 using a Lithium triborate (LBO) crystal, a Cesium Lithium Borate (CLBO) crystal or a beta-Barium Borate (BBO) crystal.

In at least one embodiment, final frequency doubling stage 130B includes a nonlinear crystal grating assembly including an interdigitated grating configuration that is configured for quasi-phase-matching (QPM) in a manner similar to that described above with reference to final frequency doubling stage 130A of FIG. 2A. Differences between final frequency doubling stages 130A and 130B are set forth below with reference to FIGS. 3A and 3B.

Figure 3A:
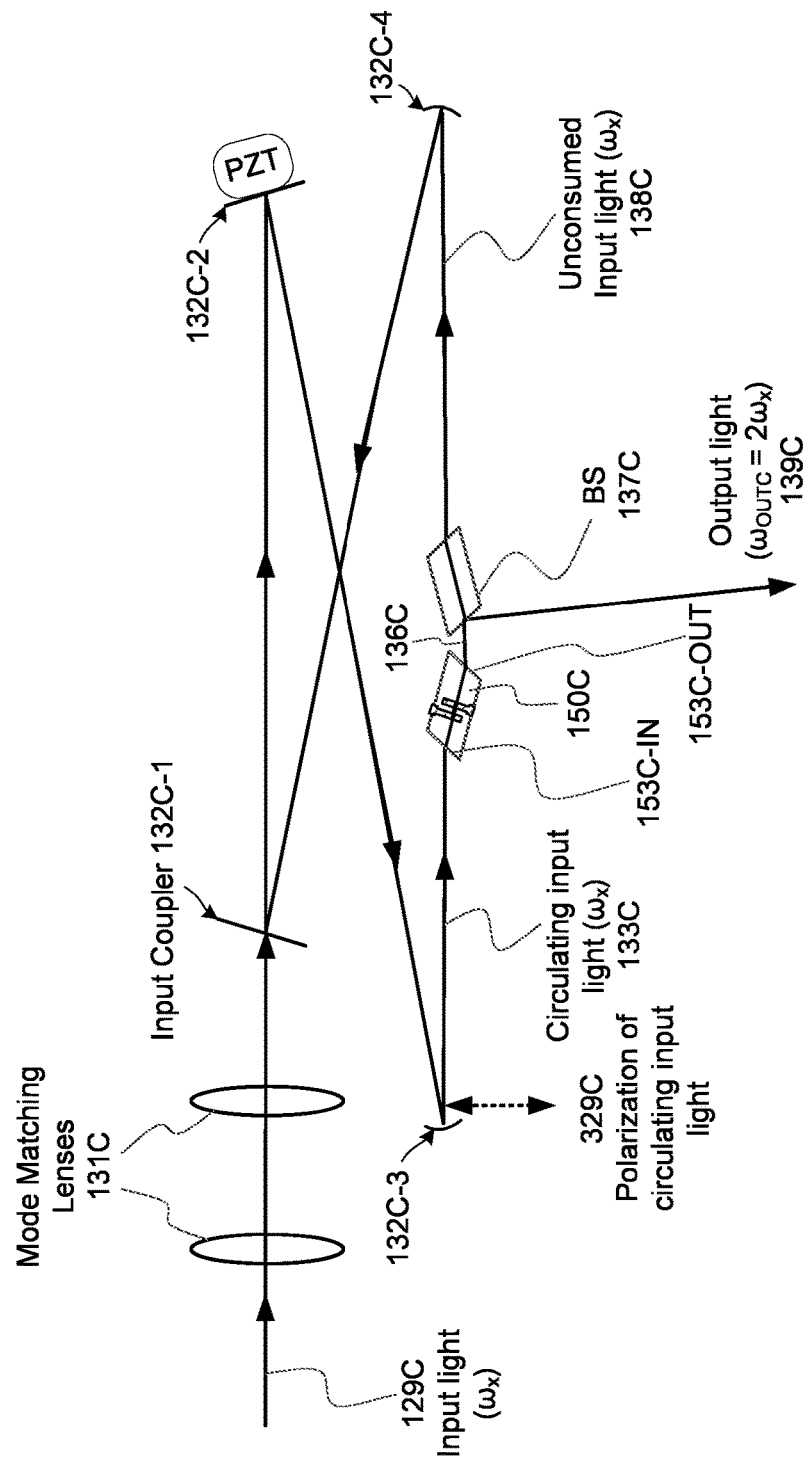
FIG. 3A is a simplified diagram showing an exemplary final frequency doubling stage utilized in the laser assemblies of the first and second specific embodiments according to an exemplary embodiment of the present invention.

FIG. 3A is a simplified diagram showing an exemplary final frequency doubling stage 130C utilized in the 133 nm laser assembly 100A of FIG. 2A and in the 177 nm laser assembly 100B of FIG. 2B according to exemplary embodiments of the present invention. Input light 129C with frequency $\omega_x$ (for example, $\omega_x=4\omega_1$ when stage 130C is used in the 133 nm laser 100A, or $\omega_x=2\omega_1+\omega_2$ when stage 130B is used in the 177 nm laser 100B) enters a bow-tie ring cavity comprising input coupler 132C-1, flat mirror 132C-2, curved mirrors 132C-3, 132C-4 that collectively form optical elements configured to direct input light beam 129C along an optical path that passes through a nonlinear crystal grating assembly 150C (i.e., such that input light beam 129C is directed in a selected propagation direction onto input surface 153C-IN). Exiting light 136C, which is output from nonlinear crystal grating assembly 150C through output surface 153C-OUT, comprises unconsumed input light 138C and generated laser output light 139C with an output frequency $\omega_{OUTC}$ that is equal to twice the frequency of the input light 129C (i.e., frequency $\omega_{OUTC}$ can be either equal to the eighth harmonic output light 139A of FIG. 2A or the sixth harmonic output light 139B of FIG. 2B). Unconsumed input light 138C passes through beam splitter (BS) 137C and is recirculated to enhance the power. The laser output light 139C is reflected from the surface of beam splitter (BS) 137C and directed out of the cavity.

Preferably, nonlinear crystal grating assembly 150C is configured so that input surface 153C-IN and output surface 153C-OUT are oriented approximately at Brewster's angle relative to the circulating input light 133C. The polarization direction of the circulating input light 133C is illustrated by arrow 329C. Furthermore, BS 137C may be configured to laterally displace the circulating input light 133C in the cavity by an amount that substantially offsets the lateral displacement of the input light caused by grating assembly 150C, so as to maintain a substantially symmetric bow-tie cavity and simplify optical alignment of the cavity.

In one embodiment, BS 137C may comprise an SBO crystal, SBO glass or a $CaF_2$ crystal. Since SBO has good deep UV transmission and has a high damage threshold, SBO may advantageously be used as a substrate material for the BS 137C to ensure long life in spite of the high-power level of the unconsumed input light 133C circulating in the cavity. If BS 137C comprises an SBO crystal, its thickness and/or the orientation of its crystal axes may be configured so as to minimize any frequency doubling of the unconsumed input light 133C passing through it. BS 137C may comprise a dichroic beam splitter, prism, or other component to separate the wavelengths. In one embodiment, grating assembly 150C is configured so that output light 139C has orthogonal polarization relative to circulating input light 133C. In this embodiment, BS 137C may comprise a polarizing beam splitter configured to transmit unconsumed input light 138C and reflect output light 139C. In one embodiment, BS 137C has its surfaces oriented so that the unconsumed input light 138C is substantially p-polarized relative to those surfaces and the surfaces are at approximately Brewster's angle relative to that unconsumed input light.

According to FIG. 3A, the input light ($\omega_x$) 129C is focused by one or more lenses 131C before entering the cavity to match the intrinsic mode of the resonant cavity that has a beam waist inside or proximate to nonlinear crystal 150C. In at least one embodiment, one or more lenses 131C include one or more cylindrical lenses comprising SBO glass or crystal and configured to operate at approximately Brewster's angle relative to the incoming light 129C so as to minimize reflection losses without using an antireflection coating. SBO is a suitable material for such lenses as it has high damage threshold at UV and DUV wavelengths. Unconsumed input light 138C ($\omega_x$) passing through BS 137C gets reflected by mirror 132C-4 and circulates inside the cavity to build up the intensity. If the enhanced input light ($\omega_x$) power density is intense enough, the conversion efficiency from the input light ($\omega_x$) to output light 139C ($2\omega_x$) may be very high, up to or even higher than 50%. Output light 139C ($2\omega_x$) with a wavelength near 177 nm or near 133 nm exits the cavity after reflection from the BS 137C.

In an alternative embodiment, input surface 153C-IN of grating assembly 150C may be coated with an appropriate anti-reflection coating instead of orienting input surface 153C-IN and output surface 153C-OUT at Brewster's angle.

Although FIG. 3A depicts final frequency doubling stage 130C as including a cavity comprising two flat mirrors and two curved mirrors, other combinations of mirrors and/or lenses may be used to refocus the light circulating in the cavity. For example, in an alternative embodiment, final frequency doubling stage 130C may comprise a delta cavity, a standing-wave cavity, or other shaped cavity instead of a bow-tie cavity. If a standing-wave cavity is used, the output light may be generated in the same direction as the input light. Any of these cavities can be stabilized with standard PDH or HC locking techniques. The cavity length is adjusted to maintain resonance by adjusting the position of one of the mirrors (such as mirror 132C-2 in FIG. 3A) or the position of a prism, through a control signal (not shown) connected to a piezo-electric transducer (PZT), voice coil or another actuator. Note that when final frequency doubling stage 130C is used in a pulsed laser, no cavity is needed, and input light 129C may be directed to, and focused in or proximate to, grating assembly 150C by any suitable combination of lenses and/or mirrors.

Figure 3B:
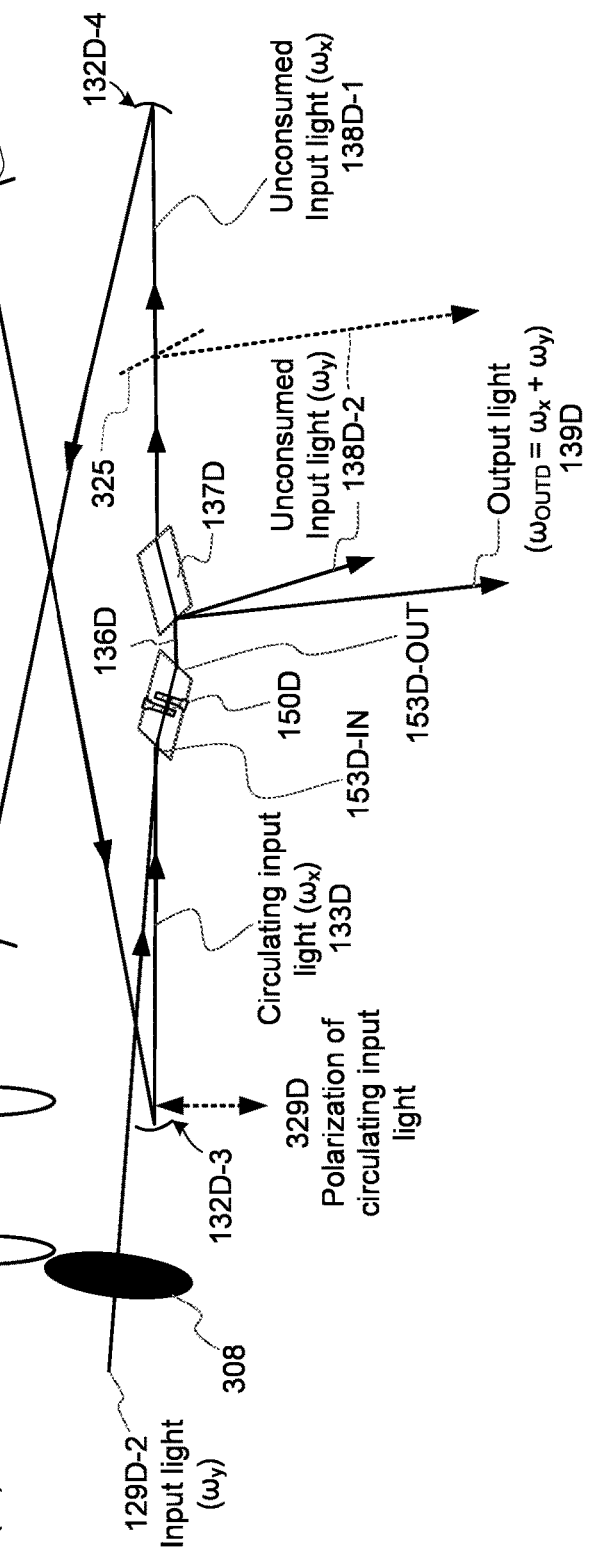
FIG. 3B is a simplified diagram showing an exemplary final frequency summing stage utilized in the laser assemblies of the third, fourth and fifth specific embodiments according to an exemplary embodiment of the present invention.
Figure 7A:
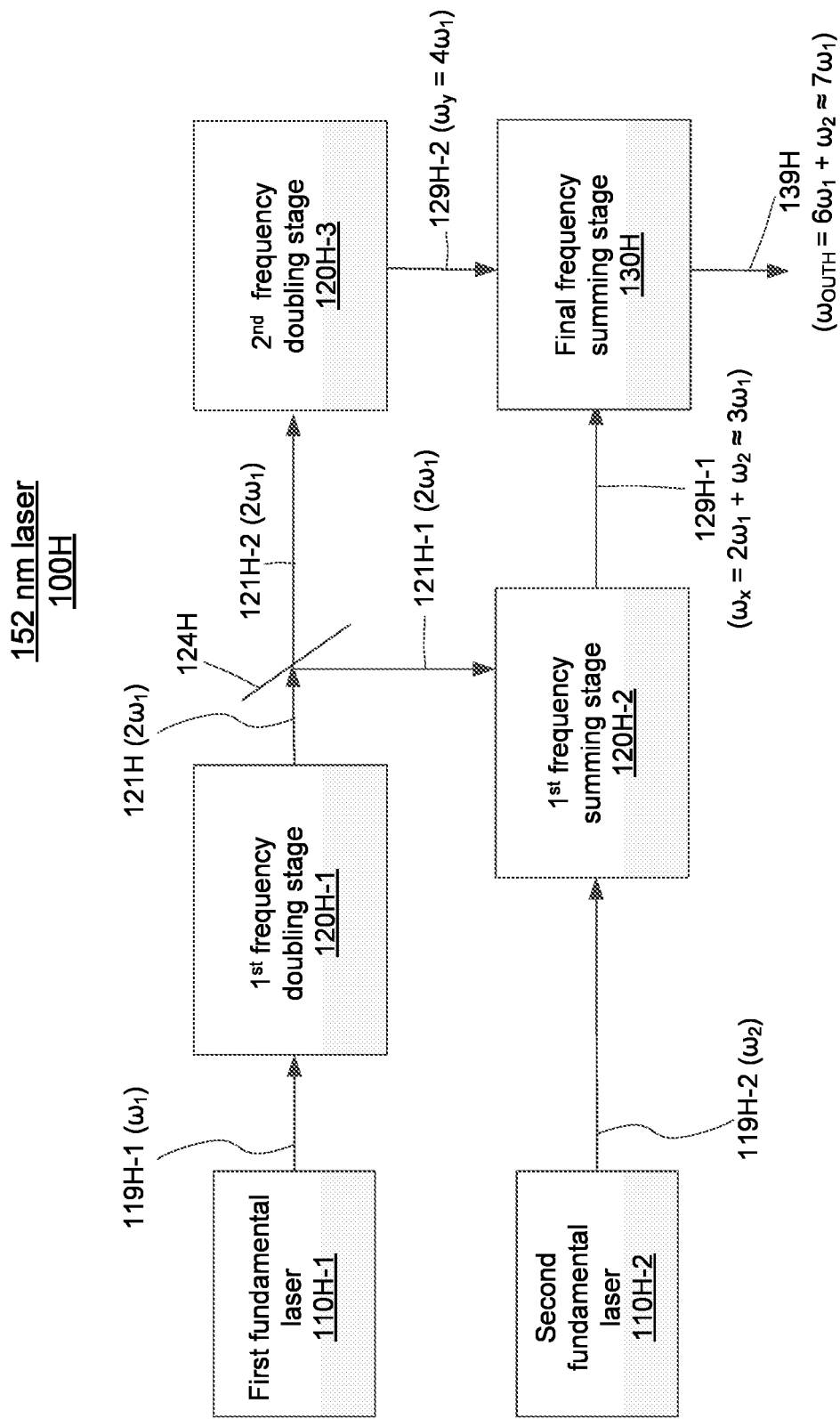
FIGS. 7A, 7B and 7C are simplified block diagrams respectively showing simplified laser assemblies according to additional specific embodiments of the present invention.
Figure 7B:
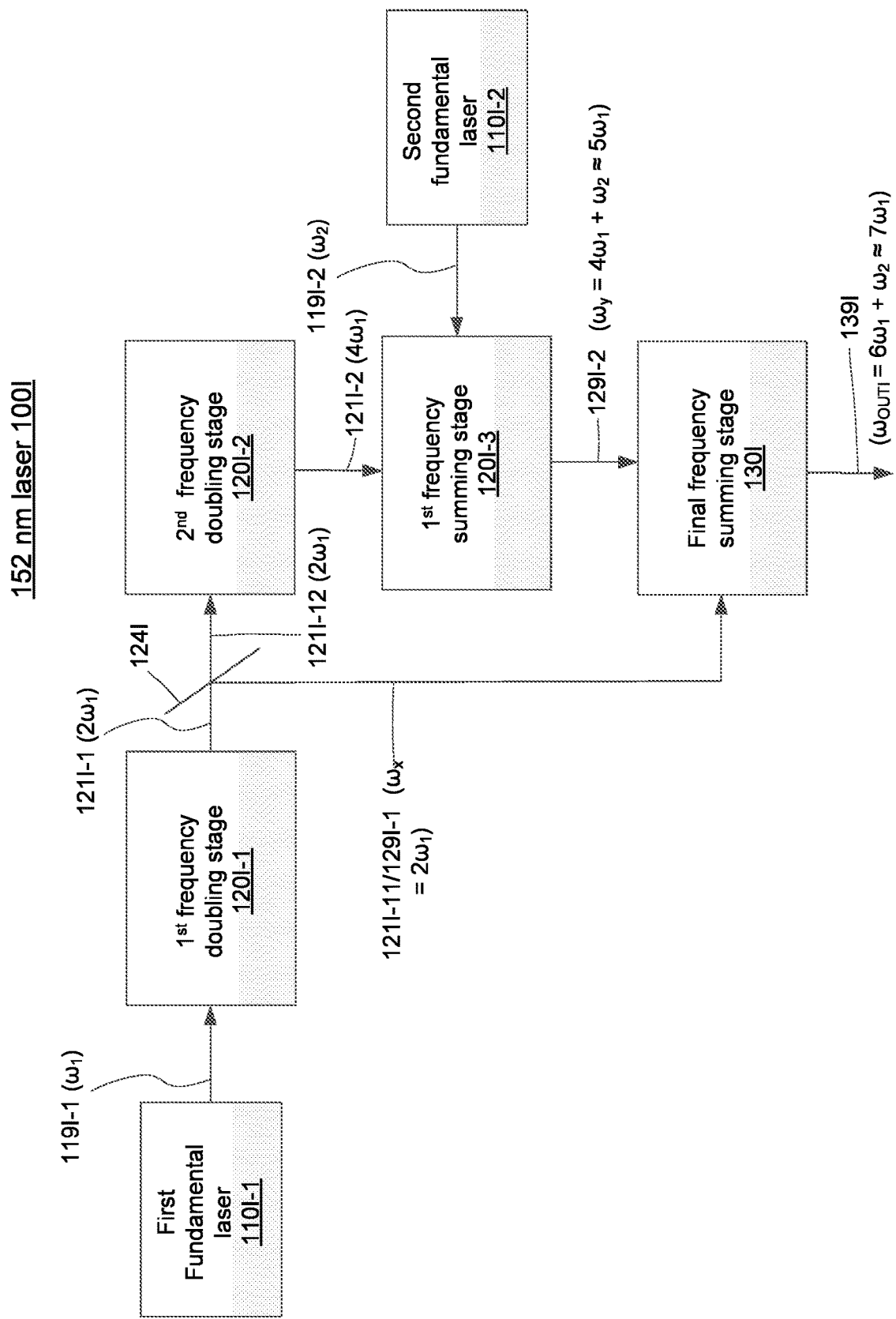
Figure 7C:
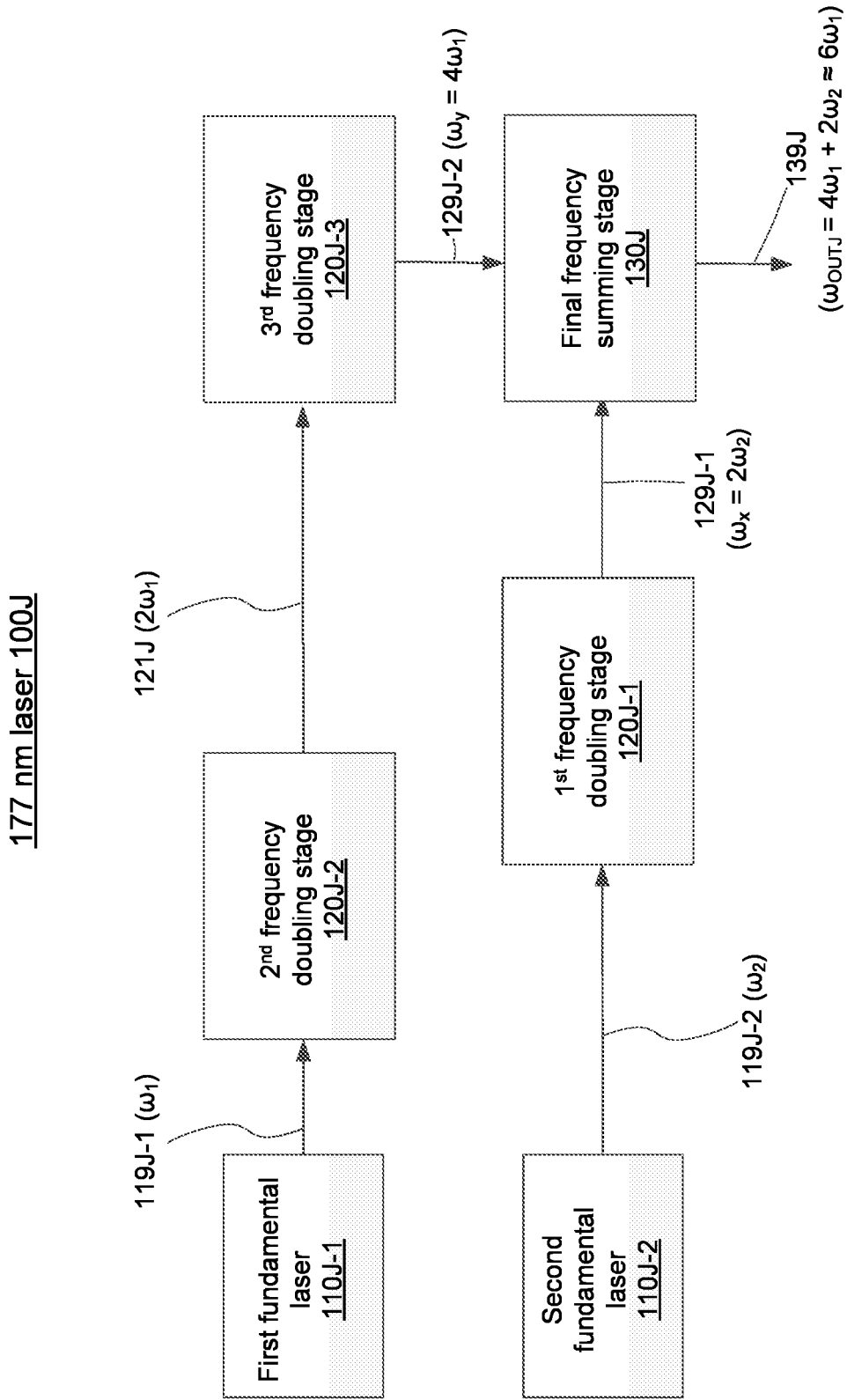

FIG. 3B is a simplified diagram showing an exemplary final frequency summing stage 130D utilized in the 152 nm laser assembly 100H of FIG. 7A, in the 152 nm laser assembly 100I of FIG. 7B and in the 177 nm laser assembly 100J of FIG. 7C according to exemplary embodiments of the present invention. Input light 129D-1 (with frequency $\omega_x$, for example $\omega_x=2\omega_1+\omega_2$ when stage 130D is used in the 152 nm laser 100H of FIG. 7A, $\omega_x=2\omega_1$ when stage 130D is used in the 152 nm laser 100I of FIG. 7B, or $\omega_x=2\omega_2$ when stage 130D is used in the 177 nm laser 100J of FIG. 7C) enters a bow-tie ring cavity comprising input coupler 132D-1, flat mirror 132D-2, curved mirrors 132D-3, 132D-4 and a nonlinear crystal grating assembly 150D (including an input surface 153D-IN and an output surface 153D-OUT) through input coupler 132D-1 and is recirculated to enhance the power. Grating assembly 150D is configured using the interdigitated configuration described herein. Input light (second intermediate light beam) 129D-2 with frequency $\omega_y$, (e.g., $\omega_y=4\omega_1$ when stage 130D is used in the 152 nm laser 100H of FIG. 7A, or $\omega_y=4\omega_1+\omega_2$ when stage 130D is used in the 152 nm laser 100I of FIG. 7B, or $\omega_y=4\omega_1$ when stage 130D is used in the 177 nm laser 100J of FIG. 7C) enters the bow-tie ring cavity passing close to (but not necessarily through) mirror 132D-2 and passes through grating assembly 150D. Exiting light 136D, which is output from nonlinear crystal grating assembly 150D through output surface 153D-OUT, comprises unconsumed input light 138D-1 with frequency $\omega_x$, unconsumed input light 138D-2 with frequency $\omega_y$, and the generated laser output light 139D with an output frequency $\omega_{OUTD}$ that is equal to a sum of the frequencies wand $\omega_y$ of intermediate (input) light beams 129D-1 and 129D-2 (i.e., frequency $\omega_{OUTD}$ can be either substantially equal to the seventh harmonic output light 139H and 139I of FIG. 7A or 7B, or the sixth harmonic output light 139J of FIG. 7C). The laser output light 139D is reflected from the input surface of beam splitter 137D and directed out of the cavity. Unconsumed input light 138D-1 with frequency $\omega_x$ passes through beam splitter 137D and optional beam splitter 325 (if present) and is reflected by mirrors 132D-4 and 132D-1 to enhance the intensity of circulated light 133D. Unconsumed input light 138D-2 of frequency $\omega_y$ exits the cavity after being reflected either from beam splitter 137D or from an optional (second) beam splitter 325. The polarization direction of the circulating input light 133D is illustrated by arrow 329D.

Frequency summing stage 130D may be modified using any of the features and alternatives described above with reference to frequency doubling stage 130C of FIG. 3A. For example, stage 130D utilizes one or more lenses 131D to focus input light 129D-1 with frequency $\omega_x$ as described above, and also utilizes one or more lenses 308 to focus input light 129D-2 as it enters the cavity near mirror 132D-3, where both one or more lenses 131D and one or more lenses 308 are configured as described above with reference to lenses 131C (FIG. 3A). Furthermore, beam splitter 137D may be configured as described above with reference to beam splitter 137C of FIG. 3A. Note that when final frequency summing stage 130D is used in a pulsed laser, no cavity is needed, and input lights 129D-1 and 129D-2 may be made colinear (or nearly colinear such as within 5° of one another), directed to, and focused in or proximate to, grating assembly 150D by any suitable combination of lenses and/or mirrors.

FIGS. 4A to 4C respectively depict a first nonlinear crystal grating structure 160E, a second nonlinear crystal grating structure 170E, and a nonlinear crystal grating assembly 150E produced by assembling grating structures 160E and 170E in an interdigitated configuration. Grating assembly 150E represents an exemplary embodiment that may be configured for use in $2^{nd}$ frequency doubling stage 120A-2 and/or in final frequency doubling stage 130A of FIG. 2A, in final frequency doubling stage 130B of FIG. 2B, in $2^{nd}$ frequency doubling stage 120H-3 and/or in final frequency summing stage 130H of FIG. 7A (described below), in $1^{st}$ frequency doubling stage 120I-1 and/or in $2^{nd}$ frequency doubling stage 120I-2 and/or in final frequency summing stage 130I of FIG. 7B (described below), and/or in $3^{rd}$ frequency doubling stage 120J-3 and/or final frequency summing stage 130J of FIG. 7C (described below). Grating assembly 150E is depicted and described with reference to five mesas and three grooves for clarity and brevity and is not intended to represent a practical embodiment (see FIGS. 6A-6C, described below).

Referring to FIG. 4A, grating structure 160E includes parallel mesas 162E-1 and 162E-2 that extend from base 161E and are separated by a groove 165E. In practical embodiments, grating structure 160E is formed by etching or cutting (ruling) rectangular groove 165E (i.e., an open-ended channel or a cavity) in a single piece of nonlinear crystal material using standard fabrication techniques. For example, dry etching processes such as reactive ion etching (RIE), electron cyclotron resonance plasma etching (ECR) or inductively coupled plasma etching (ICP) can be used to form the rectangular groove 165. Alternatively, a ruling engine (such as one used for cutting diffraction gratings) or a diamond turning machine may be used to cut the grooves. Grating structure 160E is formed such that mesas 162E-1 and 162E-2 have rectangular cross-sections and parallel opposing planar surfaces. That is, mesa 162E-1 includes opposing planar surfaces 163E-11 and 163E-12 and mesa 162E-2 includes opposing planar surfaces 163E-21 and 163E-22, where each planar surface 163E-11, 163E-12, 163E-21 and 163E-22 defines an associated vertical plane that is parallel to Y-Z plane defined by the reference X-Y-Z axis shown in FIG. 4A. Each mesa 162E-1 and 162E-2 is also formed with a width T1 (as measured in the X-axis between the associated opposing planar surfaces) that is determined as set forth below with reference to FIG. 5. A depth D1 of groove 165E (i.e., a height of mesas 162E-1 and 162E-2) is at least ten microns, preferably at least 50 μm or at least 100 μm, and a width T2 of groove 165E (i.e., the X-axis distance between surface 163E-12 of mesas 162E-1 and surface 163E-21 of mesa 162E-2) is greater than mesa width T1 by between about 100 nm and 1 μm.

Referring to FIG. 4B, grating structure 170E includes parallel mesas 172E-1, 172E-2 and 172E-3 that extend from base 171E (including sections 171E-1 and 171E-2) and are separated by a grooves 175E-1 and 173E-2. Grating structure 170E is also formed by etching or cutting rectangular grooves 175E-1 and 175E-2 into a second single piece of nonlinear crystal material using standard fabrication techniques such that mesas 172E-1 to 172E-3 are formed with corresponding plate-like rectangular cross-sections and parallel opposing planar surfaces (i.e., mesa 172E-1 includes opposing planar surfaces 173E-11 and 173E-12, mesa 172E-2 includes a planar end surface 173E-21 and 173E-22, and mesa 172E-3 includes a planar end surface 173E-31 and 173E-32). Each mesa 172E-1 to 172E-3 is also formed with the same width T1 of mesas 162E-1 and 162E-2, and grooves 175E-1 and 175E-2 have the same depth D1 as that of groove 165E.

FIG. 4C shows grating assembly 150E after grating structures 160E and 170E have been assembled into an interdigitated configuration in which mesa 162E-1 is disposed in groove 175E-1, mesa 162E-2 is disposed in groove 175E-2 and mesa 172E-2 is disposed in groove 165E. The fabrication of grating structures 160E and 170E is coordinated such that grating structure 160E is formed with an associated upright crystal axis A11/A12/A13 that is aligned as indicated in the left side of FIG. 4C when assembled in the interdigitated configuration and grating structure 170E is formed with any of the three associated inverted crystal axes A21/A22/A23 indicated in the right side of FIG. 4C. Note that the larger width T2 of grooves 165E, 175E-1 and 175E-2 (i.e., in comparison to mesa width T1) produces gaps (spaces) 152E-1 to 152E-4 between corresponding opposing planar mesa surfaces when grating structures 160E and 170E are assembled in the interdigitated configuration. That is, gap 152E-1 is formed between planar surface 163E-11 (see FIG. 4A) of mesa 162E-1 and planar surface 173E-12 (see FIG. 4B) of mesa 172E-1. Similarly, gap 152E-2 is formed between opposing planar surfaces of mesas 162E-1 and 172E-2, gap 152E-3 is formed between opposing planar surfaces of mesas 162E-2 and 172E-2, and gap 152E-4 is formed between opposing planar surfaces of mesas 162E-2 and 172E-3. In some embodiments grating assembly 150E is disposed in a housing or chamber that contains a partial vacuum or an inert gas (e.g., argon) to prevent the collection of harmful contaminants on the opposing surfaces bordering gaps 152E-1 to 152E-4.

Note that although grating assembly 150E depicts upright grating structure 160E and inverted grating structure 170E as having the equal mesa widths T1 and equal groove widths T2, this is merely for convenience of fabrication. As can be readily understood from this disclosure, each mesa needs to have a width equal to an odd integer multiple of the critical length for QPM though it does not need to be the same odd integer multiplier for each mesa, and each groove needs to be wide enough to accept the corresponding mesa of the other grating with a small clearance (gap) on either side. Nonlinear crystal grating assemblies of the present invention are configured for use in a given optical system such that the crystal axes of inverted grating structure 170E are inverted (i.e., rotated by substantially 180°) with respect to the crystal axes of the upright grating structure 160E as shown in the upper and lower-left insets of FIG. 5 and explained in the associated description below. This physical arrangement of the crystal plates allows for QPM. This may be considered as analogous to using PPLN (periodically poled lithium niobate) for QPM except that Lithium Niobate is a ferroelectric crystal and can be periodically poled. In contrast, SBO and LBO are non-ferroelectric, so we need to physically arrange the crystal mesas to create a periodic structure for QPM.

Figure 5:
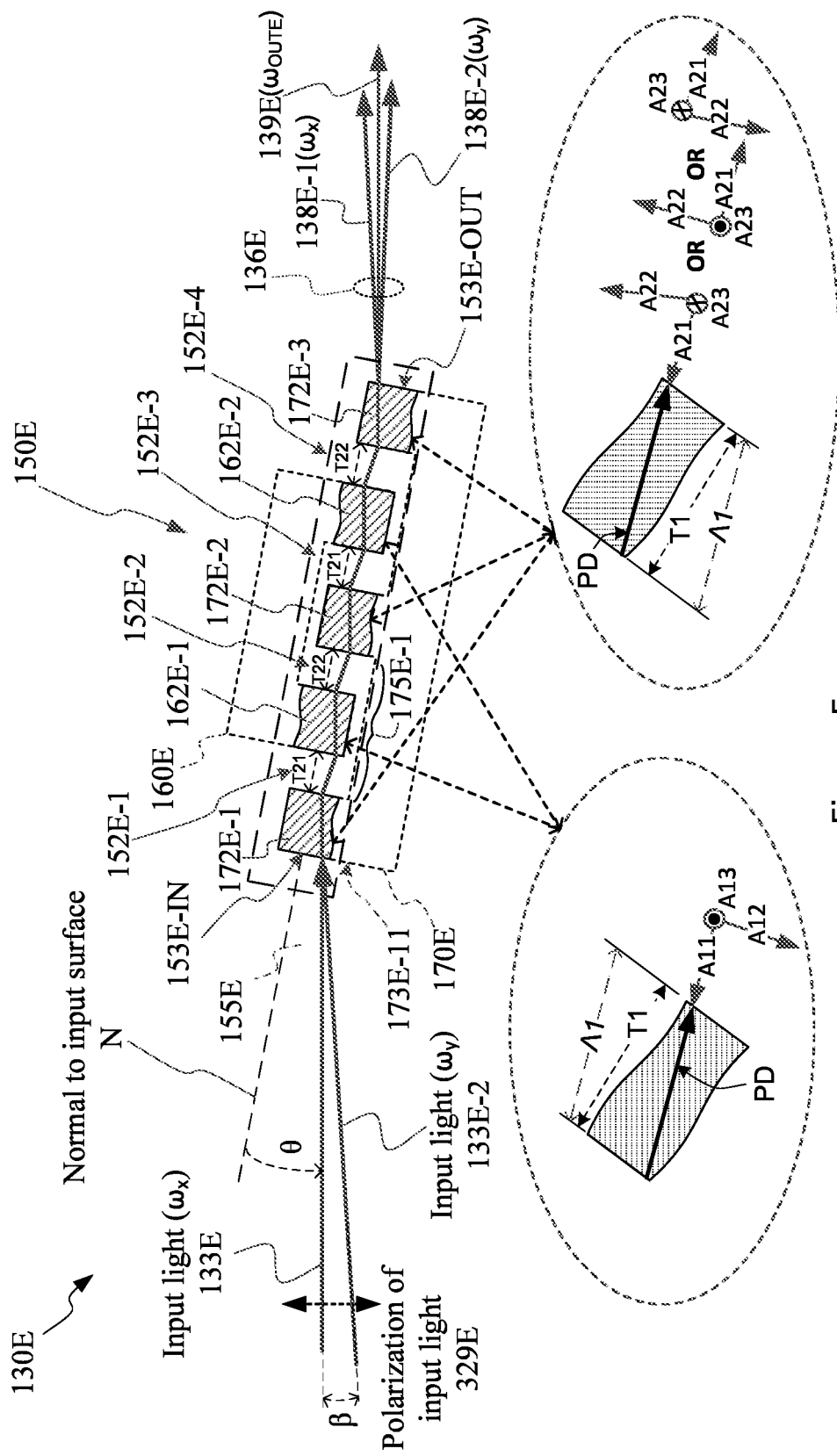
FIG. 5 is a modified cross-sectional view showing a partial final frequency conversion stage including the exemplary nonlinear crystal of FIG. 4C during operation.

FIG. 5 depicts a final frequency conversion stage 130E including optical elements (not shown) that are configured as described herein to direct input light beam 133E and optional second input light beam 133E-2 into grating assembly 150E, which is described in additional detail above with reference to FIGS. 4A to 4C. For descriptive purposes, the base portions of grating structures 160E and 170E are depicted in dashed-line (hidden) form, thereby emphasizing the interdigitated alternating grating pattern 155E formed by sequentially aligned mesas 172E-1, 162E-1, 172E-2, 162E-2 and 172E-3 through which input light 133E passes. In alternative embodiments, interdigitated alternating grating pattern 155E is configured to double the frequency $\omega_x$ of the input light 133E or configured to sum input light 133E of frequency $\omega_x$ and input light 133E-2 of frequency $\omega_y$. The input light 133E may, for example, be generated as the summing product of a second harmonic of a first fundamental light and a second fundamental light in the case of the 177 nm laser 100B (described above with reference to FIG. 2B), or as the fourth harmonic of a fundamental light in the case of the 133 nm laser 100A (described above with reference to FIG. 2A). The input lights 133E and 133E-2 may, in other examples, be generated as the summing product of a second harmonic of a first fundamental light and a second fundamental light and as the fourth harmonic of a first fundamental light in the case of 152 nm laser 100H (described above with reference to FIG. 7A), as a second harmonic of a first fundamental light and as the summing product of a fourth harmonic of the first fundamental light and a second fundamental light in the case of 152 nm laser 100I (described above with reference to FIG. 7B), or as a second harmonic of a second fundamental light and fourth harmonic of a first fundamental light in the case of 177 nm laser 100J (described above with reference to FIG. 7C). Although FIG. 5 illustrates grating assembly 150E as having a periodic structure including an interdigitated grating comprising five mesas (i.e., mesas 172E-1, 162E-1, 172E-2, 162E-2 and 172E-3), the total number of mesas may be more than ten and the total number of gaps will be one less than the number of mesas.

FIG. 5 shows that gap 152E-1 formed between mesas 162E-1 and 172E-1 has a gap width T21, and that gap 152E-2 between mesas 162E-1 and 172E-2 has a gap width T22. With groove 175E-1 having groove width T2 and mesa 162E-1 having mesa width T1, is follows that groove width T2 is equal to the sum of mesa width T1 and gap widths T21 and T22. As explained above, preferably gap widths T21 and T22 should each be between about 100 nm and 1 μm. Gap widths T21 and T22 need not be equal, though generally it will be easier to assemble grating structures 160E and 170E if the mesas of each grating structure are approximately centered in the grooves of the other grating structure (i.e., if T21 and T22 are approximately equal). Preferably groove width T2 is wider than the mesa width T1 by an amount that provides enough clearance for the two grating structures to be placed together without getting stuck during the assembly process. For example, the width of each groove may be between approximately 200 nm and 2 μm wider than the width of one mesa so that the grating structures can be assembled with gaps on either side of each mesa having gap widths T21 and T22 of between about 100 nm and 1 μm. If groove width T2 is too small (for example, such that gap widths T21 and T22 are less than about 10 nm), Van der Waals force interactions between the two opposing mesa surfaces may cause the two grating structures to stick together before the assembly process is complete. Conversely, if groove width T2 is too large (e.g., larger than 1 µm, as the light at frequencies $\omega_x$ and (if present) $\omega_y$ do not travel exactly parallel to light at frequency $\omega_{OUTE}$ in the gaps due to refraction at the output surface of each mesa. Over many such gaps in an assembly including many mesas, there will be a cumulative displacement (walk off) between the light at the different frequencies which will limit the conversion efficiency.

Referring to the bubble sections at the bottom of FIG. 5, the upright crystal axes A11/A12/A13 of mesas 162E-1 and 162E-2 and the inverted crystal axes A21/A22/A22 of mesas 172E-1, 172E-2 and 172E-3 are configured as shown. Both grating structures 160E and 170E are formed and configured within final frequency conversion stage 130E such that one or both intermediate light beams 133E and 133E-2 propagates in a direction parallel to first optical axes A11 and A21, with a polarization direction 329E parallel to second optical axes A12 and A22, wherein second optical axis has a higher nonlinear coefficient than the other optical axes of the nonlinear crystal material, and mesas 162E-1, 162E-2, 172E-1, 172E-2 and 172E-3 are formed with a thickness T1 substantially equal to an odd integer multiple of a critical length $\Lambda 1$, measured in the propagation direction PD of light beam 133E ($\omega_x$), that is required to achieve quasi-phase-matching (QPM) of the incident light beams 133E and 133E-2 ($\omega_x$, $\omega_y$) and the output frequency $\omega_{OUTE}$ of a desired laser output light beam 139E. Critical length $\Lambda 1$ is the distance traveled by light beam 133E through each mesa, is determined by:

$$\Lambda 1 = m_1 L_c, \quad \text{(Equation 1)}$$

where $m_1$ is an odd integer (e.g., 1,3,5,7 . . . ) and $L_c$ is a quasi-phase-matching critical length:

$$L_c = \frac{\pi}{\Delta k}, \quad \text{(Equation 2)}$$

where $\Delta k$ is defined by:

$$\Delta k = k(\omega_{OUT}) - 2k(\omega_x) \text{ or} \quad \text{(Equation 3a)}$$

$$\Delta k = k(\omega_{OUT}) - k(\omega_x) - k(\omega_y), \quad \text{(Equation 3b)}$$

where $k(\omega)$ is the wavevector of light of frequency co in nonlinear crystal:

$$k(\omega) = \frac{\omega\, n(\omega)}{c}, \quad \text{(Equation 4)}$$

and where $n(\omega)$ is the refractive index of the nonlinear crystal material for the appropriate polarization at frequency $\omega$ and c is the velocity of light in vacuo. Note that equation 3a is applicable when final frequency conversion stage 130E is configured for frequency doubling, and equation 3b is applicable when final frequency stage 130E is configured for frequency summing. The polarization of the light at output frequency $\omega_{OUTE}$ may be selected by the appropriate choice of $L_c$ and crystal orientation if grating assembly 150E is oriented so that the polarization directions parallel to optical axes A12/A22 and to optical axes A13/A23 have different refractive indices. The choice between whether light at output frequency $\omega_{OUTE}$ is polarized parallel to axes A12/A22 or to axes A13/23 can be made based on, for example, which polarization combination has the larger conversion efficiency per mesa based on nonlinear coefficients and refractive indices of the crystal material used to form grating structures 160E and 170E. Note that critical length $\Lambda 1$ may be substantially equal to the physical mesa width T1. Although it is convenient to make the thicknesses of two mesas equal to one another as depicted, it is not necessary that they be equal as long as each mesa thickness is equal to an odd integer multiple of the critical length for phase matching as shown in Equation 1 above. Note that the correspondence between the optical axis labels A11/A12/A13 and A21/A22/A23 and the crystallographic axes of grating structures 160E and 170E depends on the nonlinear crystal material used (for example, SBO or LBO) and the selected polarization states for the input and output light. The lower right bubble in FIG. 5 depicts three different rotations of inverted crystal axis A21/A22/A23 relative to upright crystal axis A11/A12/A13 corresponding to rotation about each of the optical axes. For any given nonlinear crystal and chosen frequency conversion scheme, only one or two of these rotations will work. The rotation must invert the sign of the nonlinear coefficient to achieve QPM and must preserve the relative alignment of the input and output light polarizations relative to the crystal axes (see below).

In one embodiment, grating assembly 150E is made from SBO crystal material. For the final frequency doubling stage 130B of 177 nm of laser 100B (FIG. 2B) the quasi-phase-matching critical length $L_c$ is about 0.6 µm, whereas for the final frequency doubling stage 130A of 133 nm laser 100A (FIG. 2A) the quasi-phase-matching critical length $L_c$ is about 0.13 µm. The exemplary QPM critical length for generating 133 nm light by frequency-doubling 266 nm light was calculated from the refractive indices of SBO at wavelengths of 133 nm and 266 nm using the Sellmeier model published by Trabs et al. (cited above). Since Trabs et al. did not generate any wavelengths shorter than 160 nm, the extrapolated refractive index at 133 nm may be inaccurate. The quasi-phase-matching critical length $L_c$ is about 0.30 µm when the final frequency summing stage 130H is utilized to generate the 152 nm laser output light 139H as described below with reference to FIG. 7A, about 0.34 µm when the final frequency summing stage 130I is utilized to generate the 152 nm laser output light 139I as described below with reference to FIG. 7B, and about 0.66 µm when the final frequency summing stage 130J is utilized to generate the 177 nm laser output light 139J as described below with reference to FIG. 7C. One skilled in the relevant arts would understand how to calculate a QPM critical length for any given combination of input and output frequencies given accurate refractive indices.

In another embodiment, grating assembly 150E is made from LBO crystal material. For the final frequency doubling stage 130B (FIG. 2B) of 177 nm laser 100B the quasi-phase-matching critical length $L_c$ is about 0.6 µm when the polarization direction 329E of the input light 133E is parallel to the c axis (optical axis A12/A22). For the final frequency summing stage 130J of 177 nm laser 100J (FIG. 7C, described below) the quasi-phase-matching critical length $L_c$ is about 0.86 µm when the polarization direction 329E of input light 133E ($\omega_x=2\omega_2$) is parallel to the a axis (optical axis A11/A21), the polarization direction of the input light 133E-2 ($\omega_y=4\omega_1$) is parallel to the c axis (optical axis A12/A22), and the polarization direction of the output light 136E is parallel to the a axis (optical axis A11/A21). The refractive index value at 177 nm wavelength of LBO used to calculate these critical lengths may not be accurate, so this estimate of the QPM critical length may not be accurate. Other combinations of polarization orientations are possible for frequency doubling and frequency summing with LBO. One skilled in the relevant arts would understand how to calculate a QPM critical length for a specific input and output light polarization combination given accurate refractive indices using the above equations.

As indicated in FIG. 5, input light 133E of frequency $\omega_x$ is incident on input surface 153E-IN of grating assembly 150E, which in the present embodiment is implemented by planar surface 173E-11 of mesa 173E-1. If grating assembly 150E is configured for frequency doubling, then input light beam 133E-2 is omitted. If grating assembly 150E is configured for frequency summation, input light beam 133E-2 with frequency $\omega_y$ is also incident on input surface 153E-IN. A preferred polarization direction of the input light 133E is illustrated by the dashed-line-arrow 329E. The polarization direction of input light 133E-2 depends on the nonlinear crystal type and the chosen frequency conversion scheme. See above for some examples. The angle β between the propagating directions of input light 133E and input light 133E-2 should be small, such as less than 5°, preferably about 2° or less. Grating assembly 150E is configured such that input surface 153E-IN and output surface 153E-OUT are oriented approximately at Brewster's angle θ relative to the circulating light 133E of frequency $\omega_x$ so as to minimize reflection losses without using an antireflection coating. For SBO, Brewster's angle for light polarized parallel to the c axis (optical z axis) is approximately 60.5±1° with respect to the surface normal N for UV and visible wavelengths longer than about 210 nm. For LBO, Brewster's angle for light polarized parallel to the b axis (optical z axis) is approximately 58.5±0.2° for wavelengths between 532 nm and 355 nm. Alternatively, after forming the interdigitated grating assembly, an antireflection coating may be coated on the mesa surfaces to reduce light loss. If the mesas are coated with an antireflection coating, then the width of the mesas must be adjusted to account for the different optical path lengths of the different light frequencies passing through the coating.

In case of frequency doubling, exiting light 136E comprises output light 139E having an output frequency $\omega_{OUTE}$ equal to the second harmonic of the input light (i.e., $2\omega_x$) and unconsumed input light 138E-1 at input frequency $\omega_x$. In case of frequency summing, exiting light 136E comprises output light 139E having an output frequency $\omega_{OUTE}$ equal to the sum of the two input frequencies $\omega_x+\omega_y$, unconsumed input light 138E-1 with frequency $\omega_x$, and unconsumed input light 138E-2 with frequency $\omega_y$.

In at least one embodiment, the crystal axes are oriented such that light propagating inside the mesas of grating structures 160E and 170E propagates substantially parallel to one optical axis (labeled A11 and A21 in FIG. 4C) with a polarization direction 329E (electric field direction) of light 133E substantially parallel to another optical axis (labeled A12 and A22 in FIG. 4C). The output polarization may be parallel to optical axis A12/A22 or parallel to optical axis A13/A23, for example, to take advantage of the largest non-linear optical coefficient of the selected nonlinear crystal material or, in another example, to minimize the refractive index difference between the input and output frequencies and hence maximize the critical length. For example, SBO and LBO crystals both have an mm2 point group. The c axis, which corresponds to the axis without mirror symmetry, must be inverted. Other axes may need to have specific orientations relative to the polarizations of the input and output light depending on the chosen frequency conversion scheme. For example, in at least one embodiment utilizing SBO, the input and output polarizations should be parallel to the crystal c axis in order to take advantage of $d_{33}$, which is the largest nonlinear coefficient of the crystal. In this example, optical axis A12/A22 would correspond to the crystal c axis, and the crystals of the upright and inverted gratings could be rotated about either the a or the b axis with respect to one another. In another example, in an embodiment utilizing LBO, the largest nonlinear coefficients are $d_{32}$ and $d_{24}$ (which must be equal because of the symmetry of the crystal). For frequency doubling, the input polarization should be parallel to the b axis and the output polarization should be parallel to the c axis, so the crystals of the upright and inverted grating structures must be rotated substantially 180° about the a axis with respect to one another. These are merely examples of possible crystal axis orientations for two specific materials and are not meant to limit the scope of the invention. One skilled in the relevant arts would understand how to select the appropriate crystal axis orientations for the upright and inverted gratings for any chosen frequency-conversion application of a specific nonlinear crystal.

If the input surface 153E-IN of grating structure 170E is oriented at Brewster's angle with respect to input light 133E, then propagation direction PD of the light within mesa 172E-1 will be approximately 29.5° relative to surface normal N if grating structure 170E is fabricated from an SBO crystal and will be approximately 31.5° relative to surface normal N if grating structure 170E is fabricated from an LBO crystal.

Figure 6A:
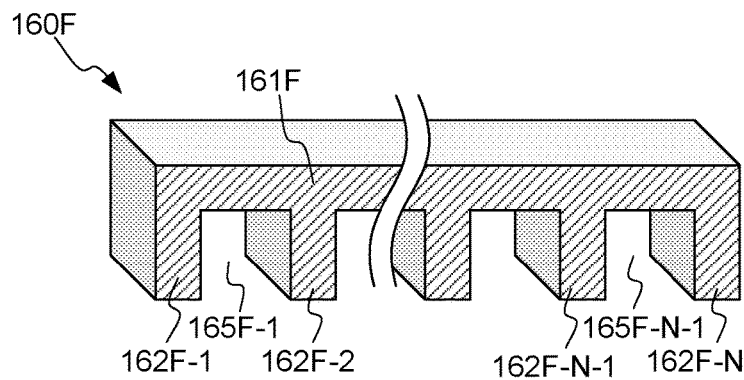
FIGS. 6A, 6B and 6C are perspective views showing a nonlinear crystal grating assembly according to another exemplary embodiment.
Figure 6B:
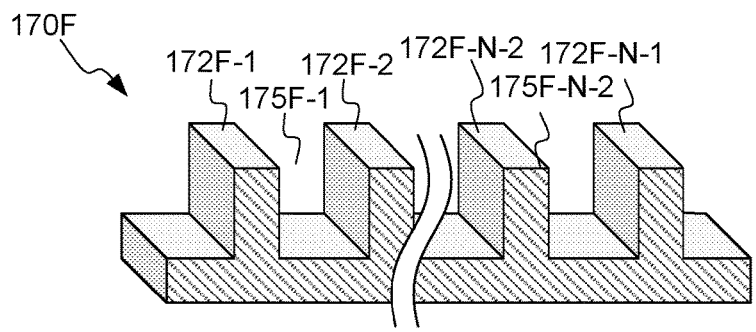
Figure 6C:
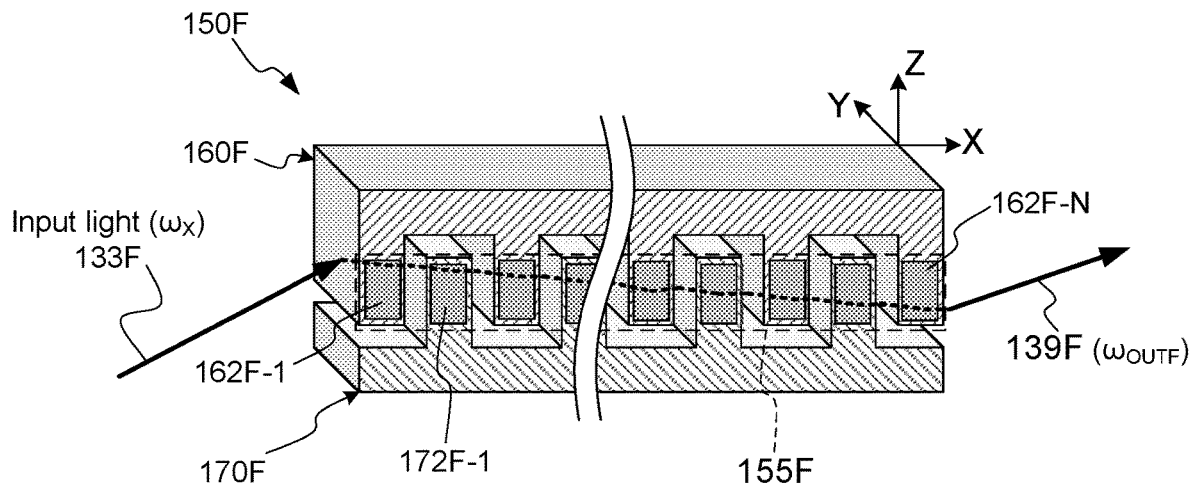

FIGS. 6A to 6C respectively depict a nonlinear crystal grating structure 160F, a nonlinear crystal grating structure 170F, and a nonlinear crystal grating assembly 150F produced by assembling grating structures 160F and 170F in an interdigitated configuration according to another embodiment. Grating structure 160F includes a row of parallel rectangular mesas 162F-1 to 162F-N that extend vertically downward (i.e., in the Y-axis direction) from a horizontally oriented base 161F and grating structure 170F includes a row of parallel rectangular mesas 172F-1 to 172F-N-1 that extend vertically upward from a base 171F. Each adjacent pair of mesas is separated by an intervening rectangular groove (e.g., mesas 162F-1 and 162F-2 are separated by groove 165F-1 and mesas 162F-N-1 and 162F-N are separated by groove 165F-N-1; similarly, mesas 172F-1 and 172F-2 are separated by groove 175F-1 and mesas 172F-N-1 and 172F-N-2 are separated by groove 175F-N-2). In one embodiment, grating structures 160F and 170F are formed by etching, cutting or otherwise processing corresponding grating structures in the manner described herein to generate mesas having mesa widths that are substantially equal to an odd integer multiple of a critical length required to achieve QPM of input light beam 133F ($\omega_x$) and laser output light beam 139F, and such that grating structure 160F has a crystal axis that is inverted (i.e., rotated by substantially 180°) with respect to a corresponding crystal axis of grating structure 170F. When assembled as indicated in FIG. 6C, grating assembly 150F includes an interdigitated alternating grating pattern 155F formed by sequentially aligned mesas 162F-1, 172F-1 . . . 172F-N-1 and 162F-N through which input light 133F passes. In some practical embodiments, the total number of mesas and grooves forming interdigitated alternating grating pattern 155F is more than ten (e.g., the total number of mesas may be one or a few hundred or about one thousand). A larger number of mesas facilitates higher energy conversion. As such, grating assembly 150F may be beneficially utilized in any of the various frequency conversion stages described herein with reference to grating assembly 150E (FIG. 4C).

FIG. 7A is a simplified block diagram showing an exemplary laser assembly 100H according to another specific exemplary embodiment of the present invention. Laser assembly 100H includes a first fundamental laser 110H-1, a second fundamental laser 110H-2, three intermediate frequency conversion stages (i.e., a first frequency doubling stage 120H-1, a frequency summing stage 120H-2 and a second frequency doubling stage 120H-3) and a final frequency summing (conversion) stage 130H that are cooperatively configured to generate laser output light 139H having a wavelength $\omega_{OUTH}$ in the range of approximately 147 nm to approximately 155 nm (e.g., approximately 152 nm). First fundamental laser 110H-1 is configured in the manner described above to generate (first) fundamental light 119H-1 having a first fundamental wavelength in the range of approximately 1000 nm to approximately 1100 nm (i.e., between about 1 μm and 1.1 μm) and a corresponding first fundamental frequency $\omega_1$. Second fundamental laser 110H-2 is also configured in the manner described above to generate (second) fundamental light 119H-2 having a second fundamental wavelength in the range of approximately 1000 nm to approximately 1100 nm (i.e., between about 1 μm and 1.1 μm) and a corresponding second fundamental frequency $\omega_2$. First frequency doubling stage 120H-1 receives the first fundamental light 119H-1 and generates second harmonic light 121H with a second harmonic frequency $2\omega_1$ equal to twice the first fundamental frequency $\omega_1$. A beam splitter 124H separates the second harmonic light 121H into two portions: a first portion 121H-1 and a second portion 121H-2. First portion 121H-1 of second harmonic light 121H is received by frequency summing stage 120H-2, which sums first portion 121H-1 with second fundamental light 119H-2 to generate a first intermediate light beam 129H-1 having a corresponding frequency $\omega_x$ that is equal to the summing frequency $2\omega_1+\omega_2$. For convenience, this summing frequency is referred to herein as substantially equal to a third harmonic (since $\omega_1$ and $\omega_2$ are similar or approximately equal). That is, when the frequencies of the first fundamental laser 110H-1 and the second fundamental laser 110H-2 are substantially the same (i.e., $\omega_1=\omega_2$) then frequency $\omega_x$ of first intermediate light beam 129H-1 is substantially equal to the third harmonic of either fundamental light frequencies $\omega_1$ or $\omega_2$ (i.e., $\omega_x \approx 3\omega_1$ or $\omega_x \approx 3\omega_2$). Frequency summing stage 120H-2 is configured in a manner similar to that described above for frequency summing stage 120B-2 with reference to FIG. 2B. Second portion 121H-2 of second harmonic light 121H is passed to second frequency doubling stage 120H-3, which is configured to generate a second intermediate light beam 129H-2 having corresponding frequency $\omega_y$ equal to equal to four times the first fundamental frequency $\omega_1$ (i.e., $\omega_y=4\omega_1$). According to the exemplary embodiment in FIG. 7A, each of the frequency doubling stages 120H-1 and 120H-3 comprises an external resonant cavity including at least three optical mirrors and a nonlinear crystal arranged therein in a manner similar to that described above with reference to second frequency doubling stage 120A-2 in FIG. 2A. Final frequency summing stage 130H uses techniques described herein to sum the first and second intermediate light beams 129H-1 and 129H-2 (i.e., $\omega_x+\omega_y$) and to generate laser output light 139H with an output frequency $\omega_{OUTH}$ that is equal to $6\omega_1+\omega_2$, which is referred to herein as substantially equivalent to seventh harmonic light (i.e., because when $\omega_1$ and $\omega_2$ are similar or approximately equal, $\omega_x+\omega_y=6\omega_1+\omega_2\approx 7\omega_1$), which in at least one embodiment has a wavelength of approximately 152 nm. In an alternative embodiment, second fundamental laser 110H-2 may be omitted, and the output of first fundamental laser 110H-1 may be divided into two portions: a first portion directed to first frequency doubling stage 120H-1, and a second portion directed to frequency summing stage 120H-2 along with second harmonic light 121H-1. In this alternative embodiment, necessarily $\omega_2=\omega_1$.

FIG. 7B is a simplified block diagram showing an exemplary laser assembly 100I configured to generate a wavelength in the range of approximately 147 nm to approximately 155 nm (e.g., approximately 152 nm) according to another specific exemplary embodiment of the present invention. Laser assembly 100I comprises a first fundamental laser 110I-1, a second fundamental laser 110I-2, three intermediate frequency conversion stages (i.e., a first frequency doubling stage 120I-1, a second frequency doubling stage 120I-2, and a first frequency summing stage 120I-3) and a final frequency summing (conversion) stage 130I to generate laser output light 139I with an output frequency $\omega_{OUTI}$ having a wavelength in the range of approximately 147 nm to approximately 155 nm (e.g., approximately 152 nm). Fundamental lasers 110I-1 and 110I-2 are configured in the manner described above to respectively generate fundamental light 119I-1 and 119I-2 having fundamental wavelengths in the range of approximately 1000 nm to approximately 1100 nm (i.e., between about 1 μm and 1.1 μm) and corresponding fundamental frequencies $\omega_1$ and $\omega_2$, respectively. First frequency doubling stage 120I-1 receives first fundamental light 119I-1 and generates the second harmonic light 121I-1 with a second harmonic frequency $\omega_1$ equal to twice the first fundamental frequency $\omega_1$. Beam splitter 124I separates second harmonic light 121I-1 into two portions: a first portion 121I-11 and a second portion 121I-12. First portion 121I-11 of second harmonic light 121I-1 is utilized as a first intermediate light beam 129I-1 having a corresponding frequency $\omega_x$ that is passed directly to final frequency summing stage 130I. Second frequency doubling stage 120I-2 receives second portion 121I-12 of second harmonic light 121I-1 and generates fourth harmonic light 121I-2 with a fourth harmonic frequency $4\omega_1$ equal to four times the first fundamental frequency $\omega_1$. First frequency summing stage 120I-3 sums the fourth harmonic light 121I-2 with the second fundamental light 119I-2 and generates a second intermediate light beam 129I-2 having a corresponding frequency $\omega_y$ equal to the summing frequency $4\omega_1+\omega_2$. For convenience, this summing frequency is referred to herein as fifth harmonic light (i.e., because when $\omega_1$ and $\omega_2$ are similar or approximately equal, the sum of the fourth harmonic of the first fundamental frequency and the second fundamental frequency is substantially equal to the fifth harmonic of the first fundamental frequency, or $\omega_y=4\omega_1+\omega_2\approx 5\omega_1$). Final frequency summing stage 130I uses techniques described herein to sum the first and second intermediate light beams 129I-1 and 129I-2 and generates laser output light 139I with an output frequency $\omega_{OUTE}$ being equal to summing frequency $6\omega_1+\omega_2$, which is referred to for convenience herein as substantially equal to the seventh harmonic of first fundamental frequency $\omega_1$ (i.e., if $\omega_1\approx\omega_2$, then $\omega_x+\omega_y=6\omega_1+\omega_2\approx 7\omega_1$), which in at least one embodiment has a wavelength of approximately 152 nm. In an alternative embodiment, second fundamental laser 110I-2 may be omitted, and the output of first fundamental laser 110I-1 may be divided into two portions: a first portion directed to first frequency doubling stage 120I-1, and a second portion directed to first frequency summing stage 120I-3 along with fourth harmonic light 121I-2. In this alternative embodiment, necessarily $\omega_2=\omega_1$.

The first frequency summing stage 120I-3 may be configured to use CLBO or hydrogen or deuterium-treated CLBO in a nearly non-critical phase matched configuration to sum fourth harmonic light 121I-2 with second fundamental light 119I-2. Alternatively, the first frequency summing stage 120I-3 may use a nonlinear crystal grating assembly of the type described herein to achieve quasi-phase-matching (QPM). In one embodiment, the nonlinear crystal grating assembly is made of SBO crystal. The critical length for QPM for generating 213 nm by summing 266 nm and 1064 nm in SBO is approximately 1.81 µm (i.e. in a range from 1.80 µm to 1.82 µm). Since this critical length is longer than the critical lengths for generating shorter wavelengths, the SBO mesa thickness in the light propagation direction may be equal to the critical length or may be equal to a small, odd integer (such as between three and nine) times the critical length. In another embodiment, the nonlinear crystal is an LBO crystal.

FIG. 7C is a simplified block diagram showing an exemplary laser assembly 100J according to another specific exemplary embodiment of the present invention. Laser assembly 100J comprises a first fundamental laser 110J-1, a second fundamental laser 110J-2, three intermediate frequency conversion stages (i.e., a first frequency doubling stage 120J-1, a second frequency doubling stage 120J-2, and a third frequency doubling stage 120J-3), and a final frequency summing (conversion) stage 130J that are cooperatively configured to generate laser output light 139J having a wavelength $\omega_{OUTJ}$ in the range of approximately 170 nm to approximately 180 nm (e.g., approximately 177 nm). Fundamental lasers 110J-1 and 110J-2 include one or more nonlinear crystal grating assemblies and are configured in the manner described above to respectively generate fundamental light 119J-1 and 119J-2 having fundamental wavelengths in the range of approximately 1000 nm to approximately 1100 nm (i.e., between about 1 µm and 1.1 µm) and corresponding fundamental frequencies $\omega_1$ and $\omega_2$, respectively. First frequency doubling stage 120J-1 receives second fundamental light 119J-2 and generates a first intermediate light beam 129J-1 having a frequency $\omega_x$ equal to a second harmonic of the second fundamental frequency $\omega_2$ (i.e., equal to twice the second fundamental frequency $\omega_2$). Second frequency doubling stage 120J-2 receives first fundamental light 119J-1 and generates second harmonic light 121J having a frequency equal to a second harmonic of first fundamental frequency $\omega_1$ (i.e., equal to twice the first fundamental frequency $\omega_1$). Third frequency doubling stage 120J-3 receives second harmonic light 121J and generates a second intermediate light beam 129J-2 having a frequency $\omega_y$ with a fourth harmonic frequency $4\omega_1$ equal to four times the first fundamental frequency $\omega_1$. Final frequency summing stage 130J uses techniques described herein to sum first intermediate light beam 129J-1 (i.e., second harmonic $2\omega_2$) and second intermediate light beam 129J-2 (i.e., fourth harmonic $4\omega_1$) and generates laser output light 139J having an output frequency $\omega_{OUTF}$ that is substantially equal to six times the first fundamental frequency (i.e., because when $\omega_1$ approximately equals $\omega_2$, $\omega_x+\omega_y=4\omega_1+2\omega_2\approx6\omega_1$), which in at least one embodiment has a wavelength of approximately 177 nm. In an alternative embodiment, second fundamental laser 110J-2 and 1$^{st}$ frequency doubling stage 120J-1 may be omitted, and the output 121J of second frequency doubling stage 120J-2 may be divided into two portions: a first portion directed to third frequency doubling stage 120J-3, and a second portion directed to final frequency summing stage 130J along with fourth harmonic light 129J-2. In this alternative embodiment, necessarily $\omega_2=\omega_1$.

The above-described figures are not meant to represent the actual physical layout of the components. The above-described figures show the main optical modules involved in the process, but do not show every optical element. One skilled in the appropriate arts would understand how to build the 177 nm, 152 nm, 133 nm and similar lasers from the above-described figures and their associated descriptions. It is to be understood that more or fewer optical components may be used to direct the light where needed. Lenses and/or curved mirrors may be used to focus the beam waist to foci of substantially circular or elliptical cross sections inside or proximate to the non-linear crystals where appropriate. Prisms, beam-splitters, gratings or diffractive optical elements may be used to steer or separate the different wavelengths at the outputs of each frequency conversion stage when needed. Prisms, coated mirrors, or other elements may be used to combine the different wavelengths at the inputs to the frequency conversion stages as appropriate. Beam splitters or coated mirrors may be used as appropriate to divide one wavelength into two beams. Filters may be used to block or separate undesired wavelengths at the output of any stage. Waveplates may be used to rotate the polarization as needed. Other optical elements may be used as appropriate. One skilled in the appropriate arts would understand the various tradeoffs and alternatives that are possible in the implementation of the 177 nm, 152 nm, 133 nm and similar lasers.

In the various alternative embodiments described above, the first fundamental laser may be configured to generate first fundamental light at first fundamental frequency $\omega_1$ having a corresponding wavelength equal to one of approximately 1070 nm, approximately 1064 nm, approximately 1053 nm, approximately 1047 nm, and approximately 1030 nm. If used, the second fundamental laser may be configured to generate second fundamental light at second fundamental frequency $\omega t$ having a corresponding wavelength equal to one of approximately 1070 nm, approximately 1064 nm, approximately 1053 nm, approximately 1047 nm, and approximately 1030 nm. The various harmonic frequencies mentioned herein are based on corresponding multiples of the fundamental frequencies. The exact wavelength of light generated by a given fundamental laser depends on many factors including the exact composition of the lasing medium, the operating temperature of the lasing medium, and the design of the optical cavity. Two lasers using the same laser line of a given lasing medium may operate at wavelengths that differ by a few tenths of 1 nm or a few nm due to the aforementioned and other factors. One skilled in the appropriate arts would understand how to choose the appropriate first and second fundamental wavelengths in order to generate the desired output wavelength from any one or two fundamental wavelengths.

Although the present invention is described herein using various fundamental wavelengths that facilitate generating laser output light at desired wavelengths of approximately 177 nm, approximately 152 nm or approximately 133 nm, other wavelengths within a few nanometers of these desired wavelengths can be generated using different fundamental wavelengths. Unless otherwise specified in the appended claims, such lasers and systems utilizing such lasers are considered within the scope of this invention.

Compared to pulsed lasers, a CW light source has a constant power level, which avoids the peak power damage issues. Also, the bandwidth of the generated CW light is several orders of magnitude narrower than typical mode-locked lasers, so the design of the corresponding illumination or detection optical system can be less complex with better performance and lower system cost. However, some inspection and metrology applications can tolerate the higher bandwidth and peak power levels of a pulsed laser. A pulsed laser is simpler than a CW laser as resonant cavities are not needed for the frequency conversion stages. Hence both CW and pulsed lasers are within the scope of the invention disclosed herein and may be used as appropriate.

CW lasers and lasers with high-repetition rates with a wavelength shorter than sub-200 nm are not commercially available at sufficient power level or are unreliable. In particular, there are no currently available lasers for generating light of hundreds of mW of power or greater in a wavelength range between approximately 125 nm and 190 nm. The embodiments of the present invention generate short wavelength light down to approximately 133 nm, therefore provide better sensitivity for detecting small particles and defects than longer wavelengths. Another aspect of the invention is a wafer, reticle or photomask inspection or metrology system that incorporates at least one of the inventive 177 nm, 152 nm and 133 nm lasers described above. Aspects of such systems are illustrated in FIGS. 8, 9A, 9B and 10.

Figure 8:
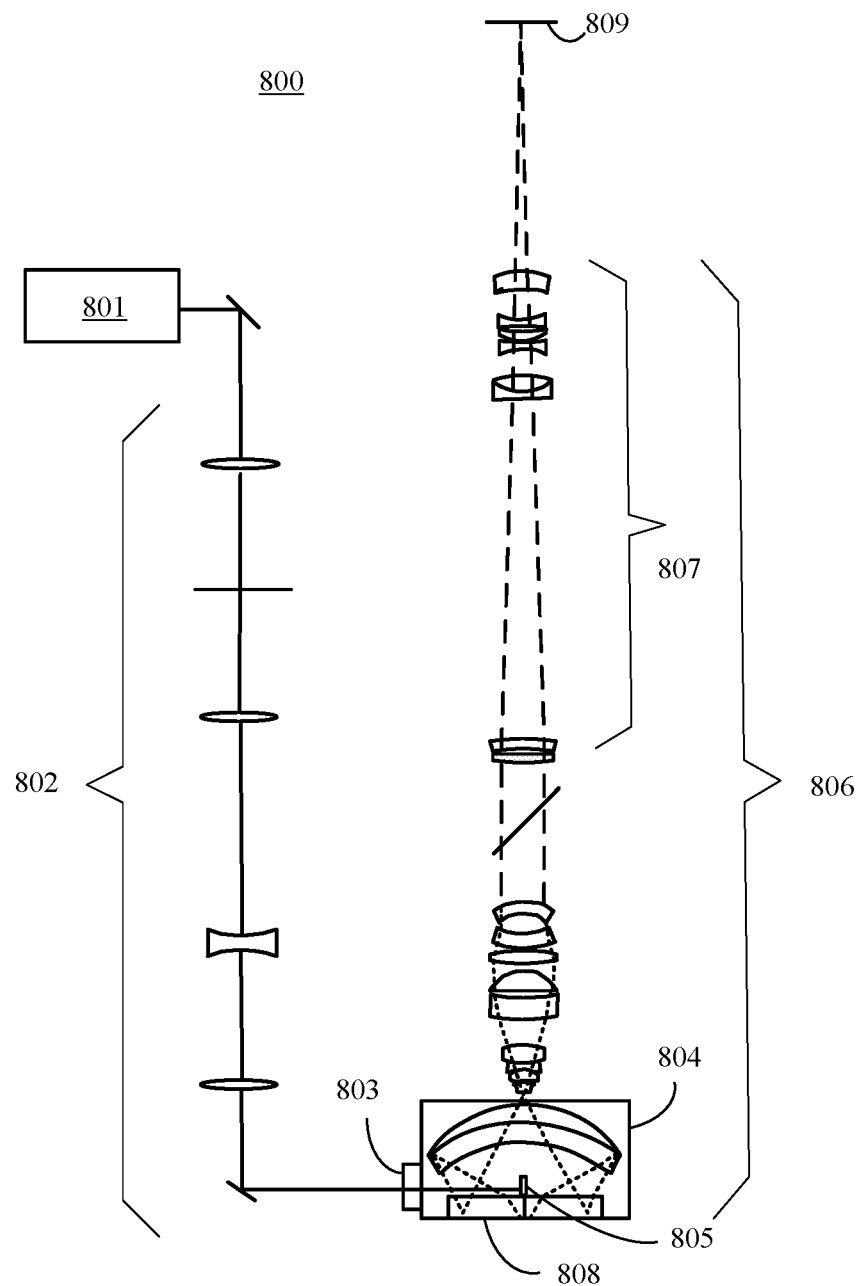
FIG. 8 is a simplified diagram showing an exemplary inspection system with dark-field and bright field inspection modes that utilizes one of the laser assemblies described herein in accordance with another specific embodiment of the present invention.

This laser may be used in an inspection system with dark-field and bright-field inspection modes as shown in FIG. 8. This figure and the system are explained in U.S. Pat. No. 7,817,260 to Chuang et al., which is incorporated by reference as if fully set forth herein. FIG. 8 illustrates a catadioptric imaging system 800 incorporating normal incidence laser illumination. The illumination block of system 800 includes a laser 801, adaptation optics 802 to control the illumination beam size and profile on the surface being inspected, an aperture and window 803 in a mechanical housing 804, and a prism 805 to redirect the laser along the optical axis at normal incidence to the surface of a sample 808. Prism 805 also directs the specular reflection from surface features of sample 808 and reflections from the optical surfaces of an objective 806 along the optical path to an image plane 809. Lenses for objective 806 can be provided in the general form of a catadioptric objective, a focusing lens group, and a zooming tube lens section 807. In at least one embodiment, laser 801 can be implemented by the one of above-described lasers.

Figure 9A:
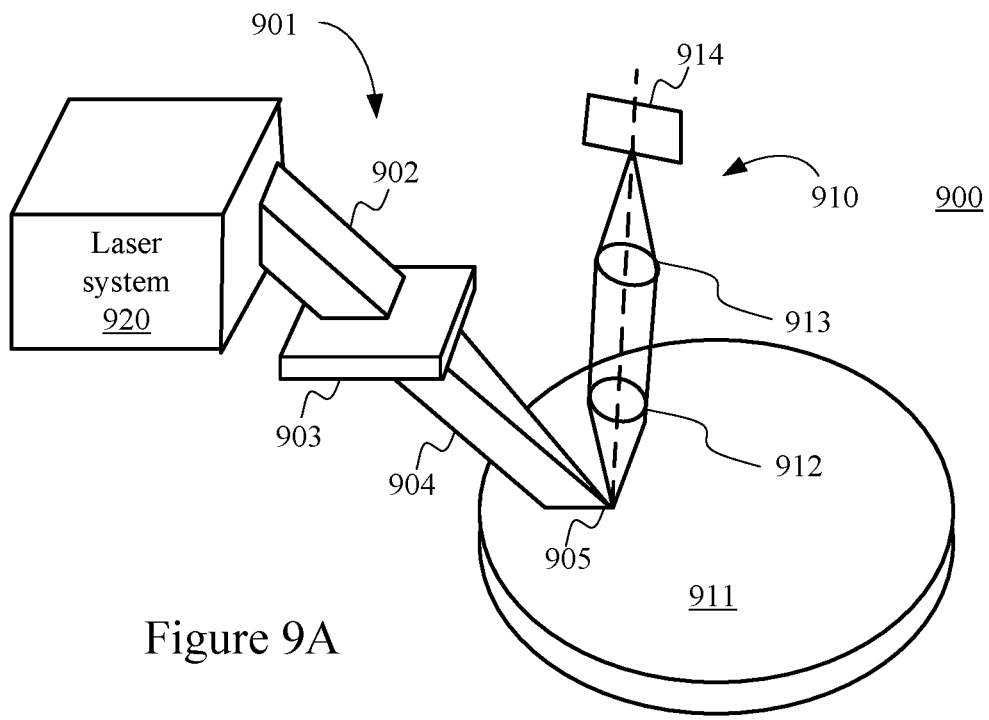
FIGS. 9A and 9B illustrates a dark-field inspection system that utilize one of the laser assemblies described herein in accordance with another specific embodiment of the present invention.
Figure 9B:
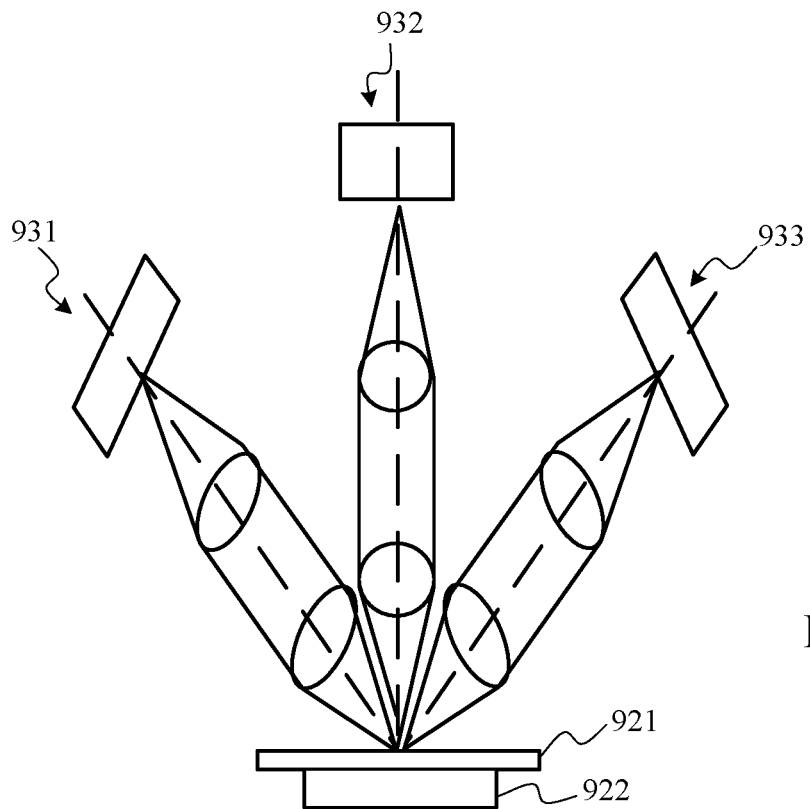

This laser may be used in a dark-field inspection system with oblique line illumination as shown in FIGS. 9A and 9B. This inspection system may have two or three different collection systems including off axis and near normal collection as shown. This dark field inspection system may also include normal incidence line illumination (not shown). More details including an explanation of the system shown in FIGS. 9A and 9B can be found in U.S. Pat. No. 7,525,649 to Leong et al., which is incorporated by reference as if fully set forth herein.

FIG. 9A illustrates a surface inspection apparatus 900 that includes illumination system 901 and collection system 910 for inspecting areas of surface 911. As shown in FIG. 9A, a laser system 920 directs a light beam 902 through beam shaping optics 903. In at least one embodiment, the laser system 920 includes at least one of the above-described lasers. First beam shaping optics 903 can be configured to receive a beam from the laser system, which is focused onto surface 911.

Beam shaping optics 903 is oriented so that its principal plane is substantially parallel to a sample surface 911 and, as a result, illumination line 905 is formed on surface 911 in the focal plane of beam shaping optics 903. In addition, light beam 902 and focused beam 904 are directed at a non-orthogonal angle of incidence to surface 911. In particular, light beam 902 and focused beam 904 may be directed at an angle between about 1° and about 85° from a normal direction to surface 911. In this manner, illumination line 905 is substantially in the plane of incidence of focused beam 904.

Collection system 910 includes lens 912 for collecting light scattered from illumination line 905 and lens 913 for focusing the light coming out of lens 912 onto a device, such as charge coupled device (CCD) 914, comprising an array of light sensitive detectors. In one embodiment, CCD 914 may include a linear array of detectors. In such cases, the linear array of detectors within CCD 914 can be oriented parallel to illumination line 905. In another embodiment, CCD 914 may include a two-dimensional array of detectors, arranged as a rectangular array with its long axis parallel to illumination line 905. For example, CCD 914 may comprise a rectangular array of approximately 1000 to 8000 detectors by approximately 50 to 250 detectors. In one embodiment, multiple collection systems can be included, wherein each of the collection systems includes similar components, but differ in orientation.

For example, FIG. 9B illustrates an exemplary array of collection systems 931, 932, and 933 for a surface inspection apparatus (wherein its illumination system, e.g., similar to that of illumination system 901, is not shown for simplicity). First optics in collection system 931 collect light scattered in a first direction from the surface of sample 921. Second optics in collection system 932 collect light scattered in a second direction from the surface of sample 921. Third optics in collection system 933 collect light scattered in a third direction from the surface of sample 921. Note that the first, second, and third paths are at different angles of reflection to said surface of sample 921. A platform 922 supporting sample 921 can be used to cause relative motion between the optics and sample 921 so that the whole surface of sample 921 can be scanned.

Figure 10:
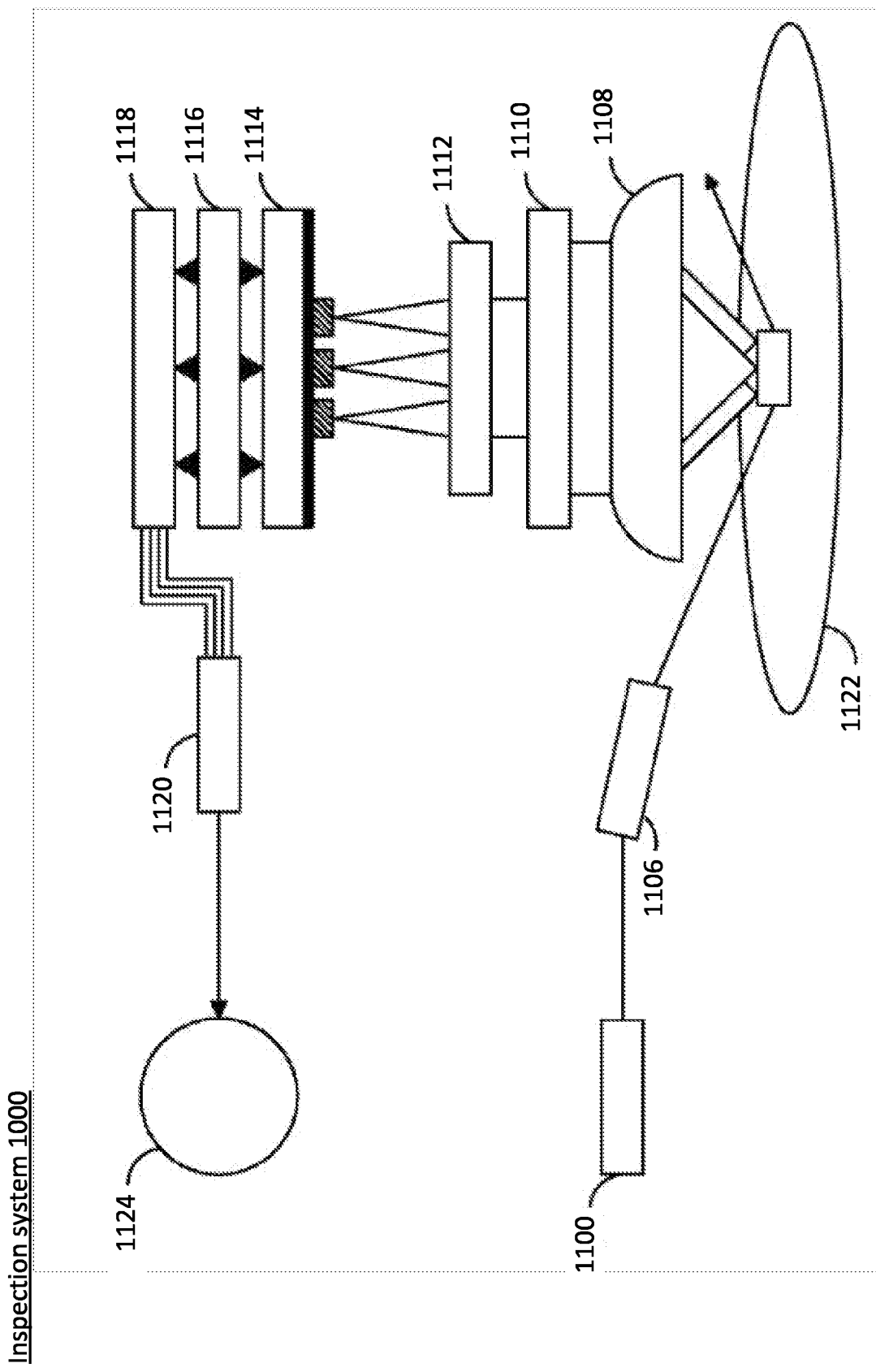
FIG. 10 illustrates an alternative dark-field inspection system configured for inspecting unpatterned wafers using one of the laser assemblies described herein in accordance with another specific embodiment of the present invention.

This laser may also be used in inspection systems for un-patterned wafers such as inspection system 1000 shown in FIG. 10. Such an inspection system may incorporate oblique and/or normal incidence illumination and a large collection solid angle for the scattered light as shown in these figures. Illumination source 1100 incorporates at least one of the laser assemblies described herein that generates DUV or VUV light to illuminate wafer 1122 at a desirable angle to ensure that reflected light is not collected by a system of imaging collection optics 1108. Optics 1106 may be configured to generate the desired illumination pattern. Scattered light from the wafer 1122 may be collected by a system of imaging collection optics 1108 configured to direct the light into an afocal lens system 1110. In one embodiment collection lens mask system 1112 may divide the light into a plurality of channels for delivery to a TDI sensor 1118. One embodiment may include an intensifier 1114 and/or a sensor relay 1116. TDI sensor 1118 and/or intensifier 1114 may be configured to transmit signals to image processing computer 1120, which may be configured to generate a wafer image and/or a list of defects or particles on the surface of wafer 1122. Additional explanation of the elements of FIG. 10 can be found in U.S. Pat. No. 9,891,177B2 to Vazhaeparambil et al. Further details on un-patterned wafer inspection systems can be found in U.S. Pat. Nos. 6,201,601 and 6,271,916. All of these patents are incorporated by reference as if fully set forth herein.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A laser assembly for generating a laser output light beam having an output frequency with a corresponding output wavelength in the range of approximately 125 nm to approximately 300 nm, said laser assembly comprising:
one or more fundamental lasers respectively configured to generate a fundamental light beam having a corresponding fundamental frequency;
one or more intermediate frequency conversion stages collectively configured to generate one or more intermediate light beams using said one or more fundamental light beams, each of said one or more intermediate light beams having an associated intermediate frequency and a corresponding intermediate wavelength;
a final frequency conversion stage configured to pass said one or more intermediate light beams pass through a nonlinear crystal grating assembly,
wherein said nonlinear crystal grating assembly includes an upright grating interleaved with an inverted grating in an interdigitated arrangement such that said one or more intermediate light beams pass through said upright and inverted gratings,
wherein each of said upright and inverted gratings comprises two parallel mesas separated by a groove, each of said upright and inverted gratings being configured such that:
a width of each said mesa in a propagation direction of the one or more intermediate light beams passing through said each mesa is substantially equal to an odd integer multiple of a critical length to achieve quasi-phase-matching (QPM) of said one or more intermediate light beams and said laser output light beam having said output frequency
a width of each groove is larger than the width of said each mesa, and
a first crystal axis of said upright grating is inverted with respect to a corresponding crystal axis of said inverted grating.

2. The laser assembly of claim 1,
wherein said one or more fundamental lasers comprise:
a first fundamental laser configured to generate first fundamental light having a first fundamental frequency with a corresponding fundamental wavelength between 1 µm and 1.1 µm, and
a second fundamental laser configured to generate second fundamental light having a second fundamental frequency with a corresponding fundamental wavelength between 1 µm and 1.1 µm,
wherein said one or more intermediate frequency conversion stages comprises:
a frequency doubling stage coupled to receive said first fundamental light, and configured to generate a second harmonic light having a second harmonic frequency equal to twice the first fundamental frequency;
a frequency summing stage coupled to receive said second harmonic light from the frequency doubling stage and the second fundamental light, and configured to generate said intermediate light beam as third harmonic light having a third harmonic frequency substantially equal to three times the first fundamental frequency, and
wherein the final frequency conversion stage is configured to frequency-double the third harmonic light such that the output frequency of the laser output light is substantially equal to six times the first fundamental frequency.

3. The laser assembly of claim 2, wherein said upright and inverted gratings comprise lithium triborate crystal.

4. The laser assembly of claim 3,
wherein said nonlinear crystal grating assembly is configured such that the first crystal axis of said upright grating is oriented such that its crystal b-axis is substantially parallel to a polarization direction of the third harmonic light passing through the upright grating,
wherein said output frequency corresponds to a wavelength that is substantially equal to 177 nm, and
wherein each said mesa has a thickness that is substantially equal to an odd multiple of a critical length which is in a range between 0.58 µm and 0.62 µm to enable quasi phase matching of the third harmonic frequency and said output frequency.

5. The laser assembly of claim 3,
wherein said nonlinear crystal grating assembly is configured such that the upright grating is oriented such that its crystal b-axis of the interdigitated grating is substantially parallel to a polarization direction of the second harmonic light passing through the upright grating,
wherein said output frequency corresponds to wavelength that is substantially equal to 266 nm, and
wherein each said mesa has a thickness that is substantially equal to an odd multiple of a critical length which is in a range between 3.3 µm and 3.7 µm to enable quasi phase matching of the second harmonic frequency and said output frequency.

6. The laser assembly of claim 1,
wherein said one or more fundamental lasers are configured to generate a fundamental light having a fundamental frequency with a corresponding fundamental wavelength between 1 µm and 1.1 µm,
wherein said one or more intermediate frequency conversion stages comprises a first frequency doubling stage coupled to receive said fundamental light, and configured to generate a second harmonic light having a second harmonic frequency equal to twice the fundamental frequency, and
wherein the final frequency conversion stage is configured to frequency-double the second harmonic light such that the output frequency of the laser output light is equal to four times the fundamental frequency.

7. The laser assembly of claim 6, wherein said upright and inverted gratings comprise lithium triborate crystal.

8. The laser assembly of claim 1,
wherein said one or more fundamental lasers comprises:
a first fundamental laser configured to generate first fundamental light having a first fundamental frequency with a corresponding fundamental wavelength between 1 µm and 1.1 µm, and
a second fundamental laser configured to generate second fundamental light having a second fundamental frequency with a corresponding fundamental wavelength between 1 µm and 1.1 µm,
wherein said plurality of intermediate frequency conversion stages comprises:
a first frequency doubling stage coupled to receive said first fundamental light, and configured to generate a second harmonic light having a second harmonic frequency equal to twice the first fundamental frequency;
a second frequency doubling stage coupled to receive a first portion of said second harmonic light from the first frequency doubling stage, and configured to generate a fourth harmonic light having a fourth harmonic frequency equal to four times the first fundamental frequency;

a frequency summing stage coupled to receive said fourth harmonic light from the second frequency doubling stage and the second fundamental light, and configured to generate a fifth harmonic light having a fifth harmonic frequency substantially equal to five times the first fundamental frequency, and wherein the final frequency conversion stage is configured to sum said fifth harmonic light with a second portion of said second harmonic light from the first frequency doubling stage such that the output frequency of the laser output light is substantially a seventh harmonic frequency of the first fundamental frequency.

9. The laser assembly of claim 8,
wherein the crystal axes of the upright and inverted gratings are oriented such that the crystal c-axes of both the upright and inverted gratings are substantially parallel to a polarization direction of the second and fifth harmonic light passing through said upright and inverted gratings,
wherein said output frequency is substantially equal to 152 nm, and
wherein at least one of said upright and inverted gratings has a mesa thickness which is substantially equal to an odd multiple of a critical length which is in a range between 0.31 μm and 0.37 μm to enable quasi phase matching of the second harmonic frequency, the fifth harmonic frequency and the seventh harmonic frequency.

10. The laser assembly of claim 1,
wherein said one or more fundamental lasers comprises:
a first fundamental laser configured to generate first fundamental light having a first fundamental frequency with a corresponding fundamental wavelength between 1 μm and 1.1 μm, and
a second fundamental laser configured to generate second fundamental light having a second fundamental frequency with a corresponding fundamental wavelength between 1 μm and 1.1 μm,
wherein said plurality of intermediate frequency conversion stages comprises:
a first frequency doubling stage coupled to receive said first fundamental light, and configured to generate a second harmonic light having a second harmonic frequency equal to twice the first fundamental frequency;
a frequency summing stage coupled to receive a first portion of said second harmonic light from the first frequency doubling stage and the second fundamental light, and configured to generate a first said intermediate light beam as third harmonic light having a third harmonic frequency substantially equal to three times the first fundamental frequency, and
a second frequency doubling stage coupled to receive a second portion of said second harmonic light from the first frequency doubling stage, and configured to generate a second said intermediate light beam as fourth harmonic light having a fourth harmonic frequency equal to four times the first fundamental frequency, and
wherein the final frequency conversion stage is configured to sum the third harmonic light received from the frequency summing stage and the fourth harmonic light received from the second frequency doubling stage such that the output frequency of the laser output light is substantially equal to seven times the first fundamental frequency.

11. The laser assembly of claim 10,
wherein the upright and inverted gratings are oriented such that the crystal c-axes of both the first and second crystal axes are substantially parallel to a polarization direction of the third and fourth harmonic light passing through said upright and inverted gratings,
wherein said output frequency is substantially equal to 152 nm, and
wherein at least one of said upright and inverted gratings has a mesa thickness which is substantially equal to an odd multiple of a critical length which is in a range between 0.27 μm and 0.33 μm to enable quasi phase matching of the third harmonic frequency, the fourth harmonic frequency and the seventh harmonic frequency.

12. The laser assembly of claim 1,
wherein said one or more fundamental lasers comprises:
a first fundamental laser configured to generate first fundamental light having a first fundamental frequency with a corresponding fundamental wavelength between 1 μm and 1.1 μm, and
a second fundamental laser configured to generate second fundamental light having a second fundamental frequency with a corresponding fundamental wavelength between 1 μm and 1.1 μm,
wherein said plurality of intermediate frequency conversion stages comprises:
a first frequency doubling stage coupled to receive said second fundamental light, and configured to generate a first said intermediate light beam having a second harmonic frequency equal to twice the second fundamental frequency;
a second frequency doubling stage coupled to receive said first fundamental light, and configured to generate second harmonic light having a second harmonic frequency equal to twice the first fundamental frequency, and
a third frequency doubling stage coupled to receive said second harmonic light from the second frequency doubling stage, and configured to generate a second said intermediate light beam having a fourth harmonic frequency equal to four times the first fundamental frequency, and
wherein the final frequency conversion stage is configured to sum said first intermediate light beam and said second intermediate light beam such that the output frequency of the laser output light has a sixth harmonic frequency that is substantially equal to six times the first fundamental frequency.

13. The laser assembly of claim 12,
wherein the crystal axes of the upright and inverted gratings are oriented such that the crystal c-axes of both the upright and inverted gratings are substantially parallel to a polarization direction of the second and fourth harmonic light passing through said upright and inverted gratings, and
wherein said output frequency is substantially equal to 177 nm.

14. The laser assembly of claim 13,
wherein the upright grating and the inverted grating are both one of strontium tetraborate crystals and lithium triborate crystals, and
wherein at least one of said upright and inverted gratings has a mesa thickness which is substantially equal to an odd multiple of a critical length which is between 0.5 µm and 0.7 µm to enable quasi phase matching of the second harmonic frequency, the fourth harmonic frequency and the sixth harmonic frequency.

15. The laser assembly of claim 12,
wherein the crystal axes of the upright and inverted gratings are oriented such that the crystal a-axes of both the upright and inverted gratings are substantially parallel to a polarization direction of the fourth harmonic light passing through said upright and inverted gratings,
wherein said output frequency is substantially equal to 177 nm,
wherein both the upright grating and the inverted grating comprise lithium triborate crystals, and
wherein at least one of said upright and inverted gratings has a mesa thickness which is substantially equal to an odd multiple of a critical length which is between 0.8 µm and 0.9 µm to enable quasi phase matching of the second harmonic frequency, the fourth harmonic frequency and the sixth harmonic frequency.

\* \* \* \* \*